US012584745B2

(12) United States Patent
Hooper et al.

(10) Patent No.: US 12,584,745 B2
(45) Date of Patent: Mar. 24, 2026

(54) DYNAMIC EASYROUTING UTILIZING ONBOARD SENSORS

(71) Applicant: NAVICO, INC., Tulsa, OK (US)

(72) Inventors: Mathew J. Hooper, Auckland (NZ); Leigh Armstrong, Auckland (NZ)

(73) Assignee: NAVICO, INC., Tulsa, OK (US)

( * ) Notice: Subject to any disclaimer, the term of this patent is extended or adjusted under 35 U.S.C. 154(b) by 525 days.

(21) Appl. No.: 17/871,835

(22) Filed: Jul. 22, 2022

(65) Prior Publication Data

US 2024/0027193 A1     Jan. 25, 2024

(51) Int. Cl.
| | |
|---|---|
| *G01C 21/00* | (2006.01) |
| *B63B 49/00* | (2006.01) |
| *B63B 79/10* | (2020.01) |
| *B63B 79/40* | (2020.01) |
| *G05D 1/00* | (2024.01) |

(52) U.S. Cl.
CPC ............ *G01C 21/005* (2013.01); *B63B 49/00* (2013.01); *B63B 79/10* (2020.01); *B63B 79/40* (2020.01); *G05D 1/0088* (2013.01); *G05D 1/0206* (2013.01)

(58) Field of Classification Search
CPC ....... G01C 21/005; B63B 49/00; B63B 79/10; B63B 79/40; B63B 79/15; G05D 1/0088; G05D 1/0206; G05D 2101/15; G05D 2109/34
See application file for complete search history.

(56) References Cited

U.S. PATENT DOCUMENTS

| | | | |
|---|---|---|---|
| 8,291,757 | B2 | 10/2012 | Johnson et al. |
| 9,821,892 | B2 | 11/2017 | Johnson et al. |
| 10,137,972 | B2 | 11/2018 | Kawasaki et al. |
| | | (Continued) | |

FOREIGN PATENT DOCUMENTS

| | | |
|---|---|---|
| AU | 2013334543 B2 | 9/2016 |
| EP | 3176068 A1 | 6/2017 |
| | (Continued) | |

OTHER PUBLICATIONS

Examination Report dated Nov. 13, 2024 issued in European Patent Application No. 23186943.9.

*Primary Examiner* — Ig T An
(74) *Attorney, Agent, or Firm* — Nelson Mullins Riley & Scarborough LLP

(57) ABSTRACT

A system for making dynamic routing decisions for a watercraft is provided. The system includes sensor(s) located on the watercraft that are configured to provide sensor data. The system also includes a processor and a memory including computer program code. When executed, the computer program code is configured to cause the processor to receive the sensor data; create a weather profile based on the sensor data, with the weather profile being specific to a current position of the watercraft; and determine watercraft operation change(s) based on the weather profile. The watercraft operation change(s) includes, for example, a change in speed for the watercraft, a change in power level at a motor, a change in direction of the watercraft, a change in direction for the motor, rotation of a rudder, raising the motor, lowering the motor, rotation of a sail, raising other underwater components, or lowering the other underwater components.

14 Claims, 12 Drawing Sheets

(56)      References Cited

U.S. PATENT DOCUMENTS

| | | | | |
|---|---|---|---|---|
| 10,235,881 | B2 | 3/2019 | Nishi | |
| 10,259,544 | B2 | 4/2019 | Venables et al. | |
| 10,538,299 | B2 | 1/2020 | Venables et al. | |
| 10,747,226 | B2 | 8/2020 | Johnson et al. | |
| 10,996,676 | B2 | 5/2021 | Johnson et al. | |
| 2012/0259489 | A1* | 10/2012 | Hamamatsu | G01C 21/203 |
| | | | | 701/21 |
| 2014/0114509 | A1 | 4/2014 | Venables | |
| 2014/0160165 | A1* | 6/2014 | Kim | G01C 21/005 |
| | | | | 345/633 |
| 2016/0195399 | A1* | 7/2016 | Nanri | B63B 49/00 |
| | | | | 701/21 |
| 2016/0337441 | A1* | 11/2016 | Bloomquist | G06Q 10/06 |
| 2019/0079112 | A1 | 3/2019 | Bjornsson et al. | |
| 2019/0202534 | A1 | 7/2019 | Venables et al. | |
| 2021/0182996 | A1* | 6/2021 | Cella | G06Q 30/018 |
| 2021/0191400 | A1 | 6/2021 | Chung et al. | |
| 2021/0214057 | A1* | 7/2021 | Tsujimoto | B63H 21/21 |
| 2021/0394877 | A1 | 12/2021 | Kadota et al. | |

FOREIGN PATENT DOCUMENTS

| | | | |
|---|---|---|---|
| EP | 2911935 | B1 | 10/2020 |
| JP | 4897450 | B2 | 3/2012 |
| JP | 6487365 | B2 | 3/2019 |
| JP | 6513677 | B2 | 5/2019 |
| JP | 6769611 | B2 | 10/2020 |
| JP | 6875330 | B2 | 5/2021 |
| JP | 6944015 | B1 | 10/2021 |
| WO | WO 2014/066645 | A1 | 5/2014 |
| WO | WO 2016/017358 | A1 | 2/2016 |
| WO | WO 2019/157400 | A1 | 8/2019 |
| WO | WO 2021/229825 | A1 | 11/2021 |

* cited by examiner

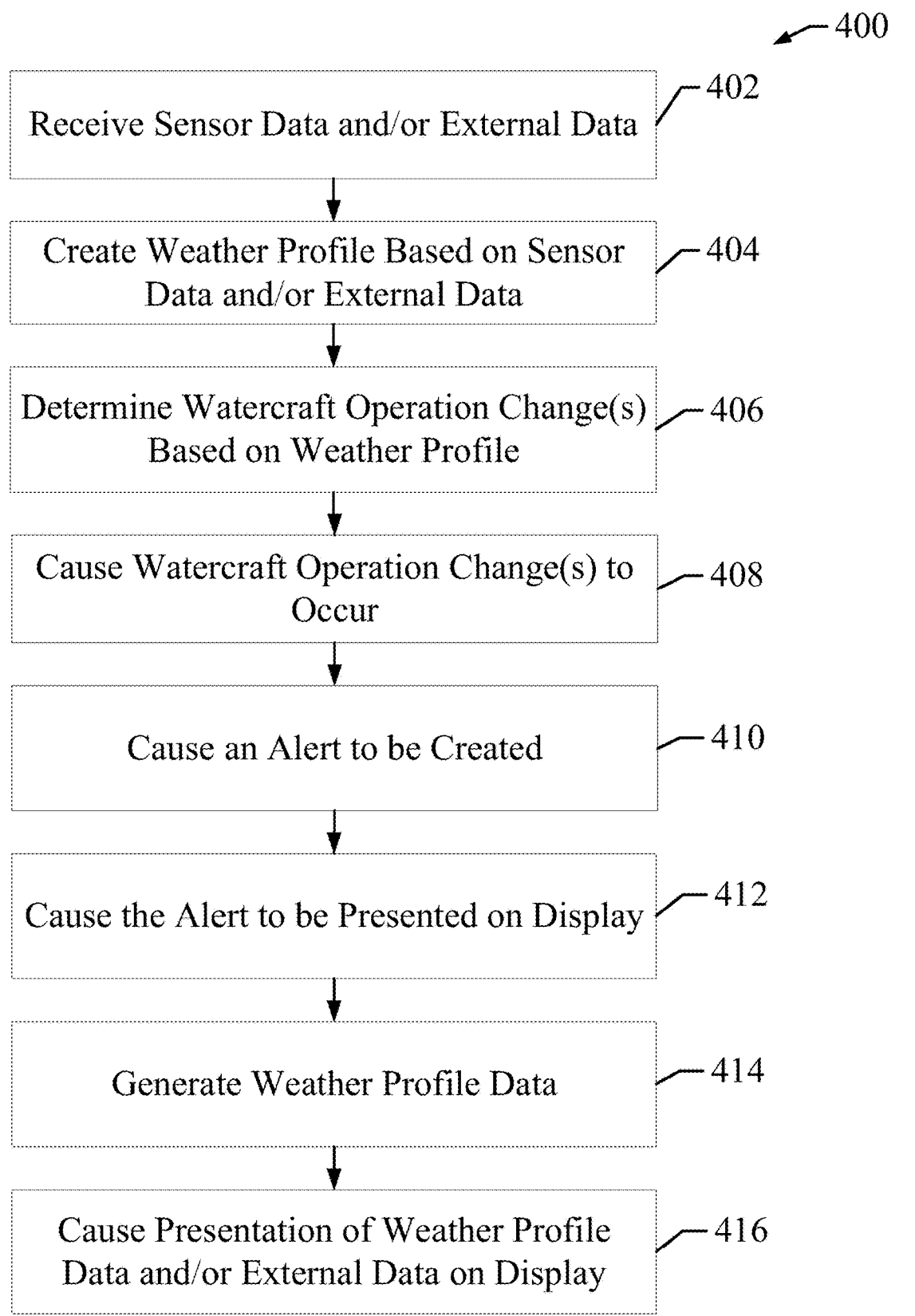

Receive Sensor Data and/or External Data —402

Create Weather Profile Based on Sensor Data and/or External Data —404

Determine Watercraft Operation Change(s) Based on Weather Profile —406

Cause Watercraft Operation Change(s) to Occur —408

Cause an Alert to be Created —410

Cause the Alert to be Presented on Display —412

Generate Weather Profile Data —414

Cause Presentation of Weather Profile Data and/or External Data on Display —416

ALERT: Waves are highly choppy along current travel direction. It is recommended to rotate towards the right by 5 degrees.

Point of Interest 1
Type: Watercraft
Distance: 10.35 km
Angle: 60.25 degrees
Velocity: 30 km/hr at 335 deg.

Point of Interest 2
Type: Watercraft
Distance: 24.87 km
Angle: 64.65 degrees
Velocity: 40 km/hr at 337 deg.

POI 2
(25 km, 65 deg)

POI 1
(10 km, 60 deg)

POI 3
(15 km, 3 deg)

WATERCRAFT

DYNAMIC EASYROUTING UTILIZING ONBOARD SENSORS

FIELD OF THE INVENTION

Embodiments of the present invention relate generally to watercraft systems using data from onboard sensors and devices to determine a weather profile and/or watercraft operation changes for the watercraft.

BACKGROUND OF THE INVENTION

Data used to make determinations about a watercraft are frequently provided from devices that are remote from a watercraft. This external data may be provided for different types of data such as temperature data, water current data, weather data, etc., but this external data is typically provided for large geographical areas. Furthermore, watercraft are commonly used in remote areas, and the watercraft and other devices frequently have limited or no cellular coverage in these areas. Thus, the watercraft have a limited ability to obtain external data and other information. Watercraft relying solely on cellular connections frequently lose a connection and may fail to promptly receive important messages, updates, or information until a cellular connection is restored.

Additionally, current weather notification and similar systems do not take into account the specifics of the actual watercraft (e.g., current operational parameters, crew member preferences, among many other considerations).

BRIEF SUMMARY OF THE INVENTION

In addition to or as an alternative to external data from third-party weather systems, onboard data from onboard sensors and devices may be used to help make decisions regarding weather and/or watercraft operation. In this regard, it may be beneficial to obtain accurate data for the precise position of the watercraft and/or to optimize the data based on unique properties of a watercraft. Where other remote-third party data is used, this data is typically an estimate for a certain parameter across a large area, and this data may not account for substantial variations in the parameter at precise locations within the larger area. For example, the water current may be significantly different in nearby areas within the water, and the use of onboard data may provide increased accuracy and may enable users and/or the systems described herein to make better navigational decisions. Furthermore, in some cases, watercraft may be used in areas with little internet connectivity, cellular connectivity, etc., and the use of onboard data provides reliable and accurate data that may be used even when the watercraft cannot form an internet connection or some other connection.

Watercraft may obtain data from other nearby watercraft in some embodiments, and this may occur through the creation and use of mesh networks. The mesh networks may be used to transfer information between watercraft even without connection to a cellular network, and nearby watercraft may transfer information using Bluetooth Low Energy (BLE) or WiFi technology, or information may be transferred through other approaches such as a VHF Data Exchange System (VDES). The formation of a mesh network may allow effective distribution of updates, onboard data, and/or additional data between watercraft. Mesh networks may permit efficient distribution of sensor data such as sonar logs, water pollution measurements, error codes, usage analytics, fish concentration, type of fish, etc., although other information may also be shared.

In some embodiments, specifics regarding the watercraft, including preferences of operation, weight distribution, or other information can be used to create the watercraft specific weather profile and/or determine how best to operate the watercraft.

In an example embodiment, a system is provided for making dynamic routing decisions for a watercraft. The system includes one or more sensors located on the watercraft that are configured to provide sensor data regarding at least one of a pitch of the watercraft, a heave of the watercraft, a roll of the watercraft, a yaw of the watercraft, a speed of the watercraft, G forces of the watercraft, an acceleration of the watercraft, an autopilot drive activity, a drive load, or a rudder angle. The one or more sensors include at least one of a radar, a position sensor, a direction sensor, a sonar transducer element, an air temperature sensor, a water temperature sensor, a current sensor, a light sensor, a wind sensor, an accelerometer, or a speed sensor. The system also includes a processor and a memory. The memory includes computer program code configured to, when executed, cause the processor to receive the sensor data and create a weather profile based on the sensor data. The weather profile is specific to a current position of the watercraft. The computer program code is also configured to cause the processor to determine one or more watercraft operation changes based on the weather profile. The one or more watercraft operation changes includes at least one of a change in speed for the watercraft, a change in power level at a motor, a change in direction of the watercraft, a change in direction for the motor, rotation of a rudder, raising the motor, lowering the motor, rotation of a sail, raising other underwater components, or lowering the other underwater components.

In some embodiments, the computer program code may be configured to, when executed, cause the processor to cause the one or more watercraft operation changes to occur or cause an alert to be created. The alert may be related to the one or more watercraft operation changes. In some related embodiments, the system may also include a display, and the computer program code may be configured to, when executed, cause the processor to cause the alert to be presented on the display.

In some embodiments, the system may include a display. Furthermore, the computer program code may be configured to, when executed, cause the processor to generate weather profile data related to the weather profile and cause presentation on the display of the weather profile data.

In some embodiments, the computer program code may be configured to, when executed, cause the processor to receive external data from a data source that is not located on the watercraft. In some related embodiments, the computer program code may be configured to, when executed, cause the processor to create the weather profile using the sensor data and the external data. In further related embodiments, the external data may include at least one of external humidity data, external temperature data, external pressure data, external precipitation data, external water current data, external weather data, external sonar data, external GPS data, external compass data, external heading sensor data, external position data from a second watercraft, external directional data from a second watercraft, external directional data from a motor or a rudder of a second watercraft, external image data from a camera, external data regarding the date or time, external navigational data, or external geographical data. In some embodiments, the external data may be received from a second watercraft. Additionally, in some embodiments, the computer program code may be configured to, when executed, cause the processor to cause presentation on the display of the external data. In some embodiments, one or more watercraft operation changes may be determined without the use of any external data.

In some embodiments, the processor may be configured to utilize a model developed through artificial intelligence, the model being formed based on historical comparisons of at least one of external data, the sensor data, or onboard data from onboard devices with a characteristic value. The external data may be from a data source that is not located on the watercraft. Further, the characteristic value may be related to the status of the watercraft. The processor may be configured to input the external data, the sensor data, or the onboard data into the model to determine the characteristic value. In some related embodiments, the characteristic value may be related to at least one of weather conditions at the current position of the watercraft, ride conditions of the watercraft, or an operating condition of a component on the watercraft.

In another example embodiment, a marine electronic device is provided for making dynamic routing decisions for a watercraft. The marine electronic device includes a processor and memory. The memory includes computer program code configured to, when executed, cause the processor to receive sensor data from one or more sensors located on the watercraft. The sensor data is related to at least one of a pitch of the watercraft, a heave of the watercraft, a roll of the watercraft, a yaw of the watercraft, a speed of the watercraft, G-forces of the watercraft, an acceleration of the watercraft, an autopilot drive activity, a drive load, or a rudder angle. The computer program code is configured to, when executed, cause the processor to create a weather profile based on the sensor data with the weather profile being specific to a current position of the watercraft. The computer program code is configured to determine one or more watercraft operation changes based on the weather profile. The watercraft operation change(s) includes at least one of a change in speed for the watercraft, a change in power level at a motor, a change in direction of the watercraft, a change in direction for the motor, rotation of a rudder, raising the motor, lowering the motor, rotation of a sail, raising other underwater components, or lowering the other underwater components.

In some embodiments, the sensor(s) may include at least one of a radar, a position sensor, a direction sensor, a sonar transducer element, an air temperature sensor, a water temperature sensor, a current sensor, a light sensor, a wind sensor, an accelerometer, or a speed sensor.

In some embodiments, the computer program code may be configured to, when executed, cause the processor to cause the watercraft operation change(s) to occur or cause an alert to be created. The alert may be related to the watercraft operation change(s).

In another example embodiment, a non-transitory computer readable medium is provided having stored thereon software instructions that, when executed by a processor, cause the processor to generate display data. This display data is generated by receiving sensor data from one or more sensors located on the watercraft regarding at least one of a pitch of the watercraft, a heave of the watercraft, a roll of the watercraft, a yaw of the watercraft, a speed of the watercraft, G-forces of the watercraft, acceleration of the watercraft, an autopilot drive activity, a drive load, or a rudder angle. This display data is also generated by creating a weather profile based on the sensor data, with the weather profile being specific to a current position of the watercraft. Display data is also generated by determining one or more watercraft operation changes based on the weather profile. The watercraft operation change(s) may include at least one of a change in speed for the watercraft, a change in power level at a motor, a change in direction of the watercraft, a change in direction for the motor, rotation of a rudder, raising the motor, lowering the motor, rotation of a sail, raising other underwater components, or lowering the other underwater components.

In some embodiments, the sensor(s) may include at least one of a radar, a position sensor, a direction sensor, a sonar transducer element, an air temperature sensor, a water temperature sensor, a current sensor, a light sensor, a wind sensor, an accelerometer, or a speed sensor. In some embodiments, the processor may be configured to receive external data from a second watercraft, and the computer program code may be configured to, when executed, cause the processor to create the weather profile using the sensor data and the external data.

In some embodiments, the computer program code may be configured to, when executed, cause the processor to cause the watercraft operation change(s) to occur or cause an alert to be created. The alert may be related to the watercraft operation change(s). In some embodiments, the computer program code may be configured to, when executed, cause the processor to generate an alert related to the watercraft operation change(s) and cause the alert to be presented on a display. Alternatively, the computer program code may be configured to, when executed, cause the processor to generate weather profile data related to the weather profile and cause presentation on the display of the weather profile data.

BRIEF DESCRIPTION OF THE DRAWINGS

Figure 1A:
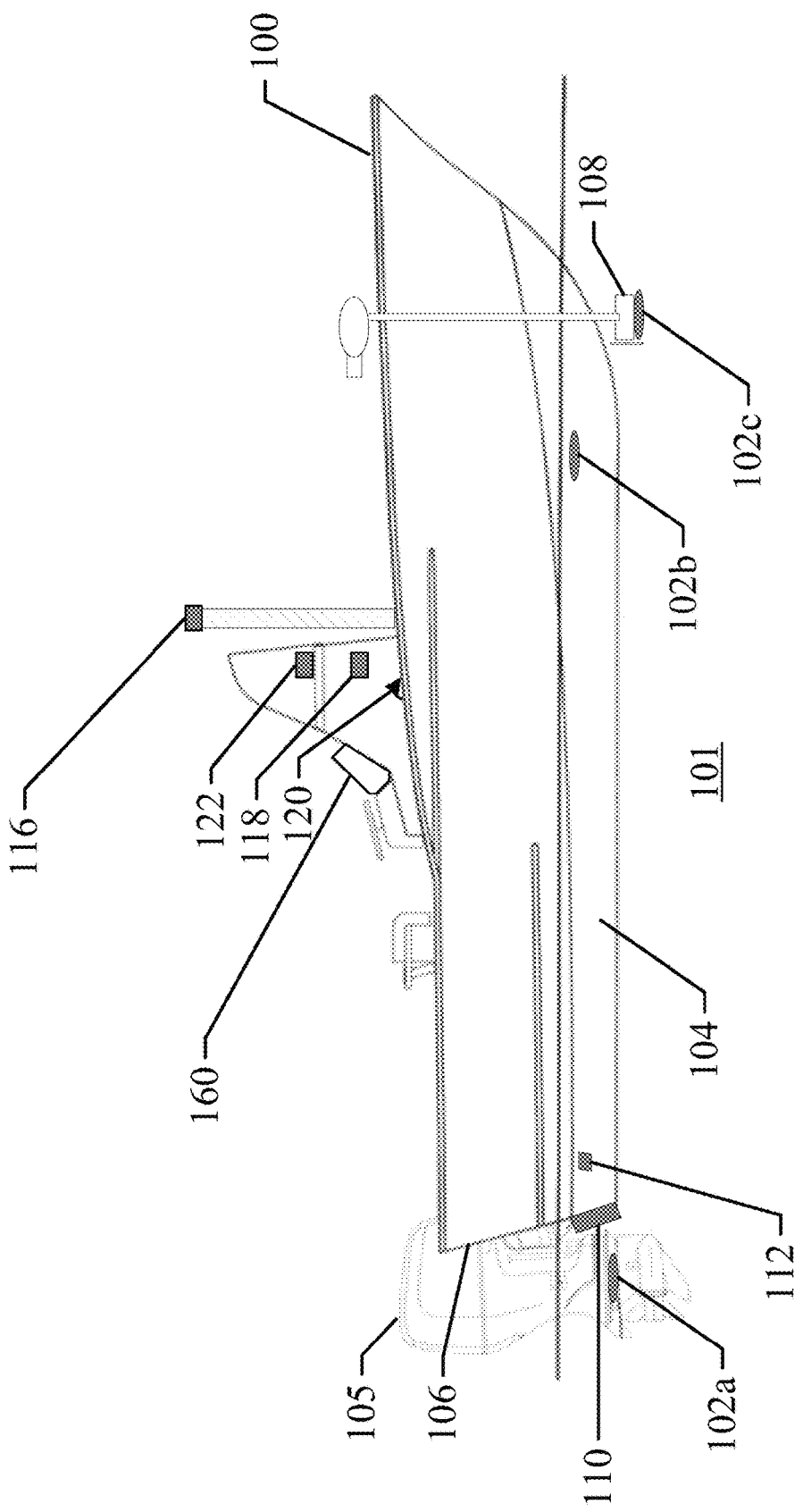
Figure 1B:
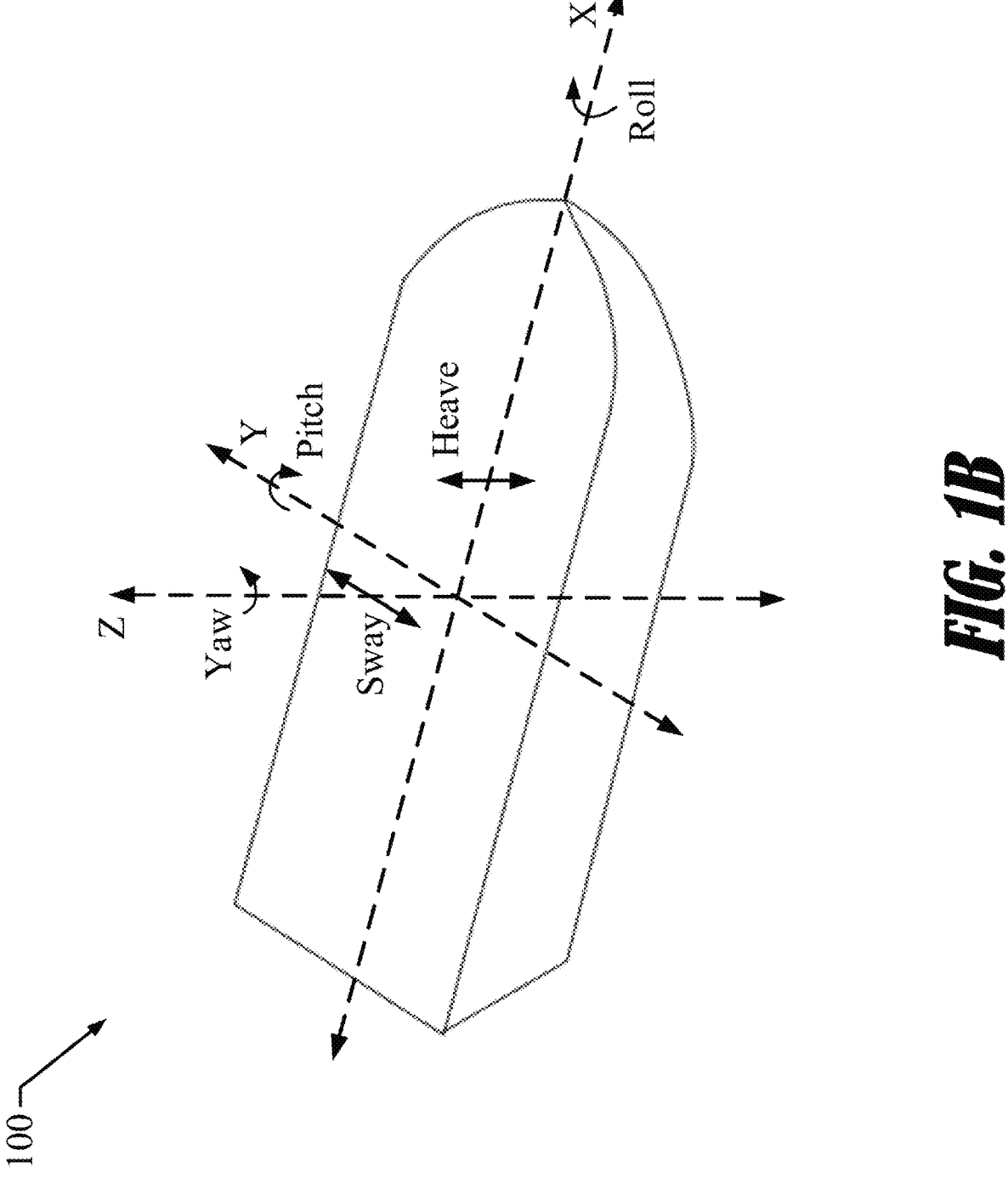
Figure 2:
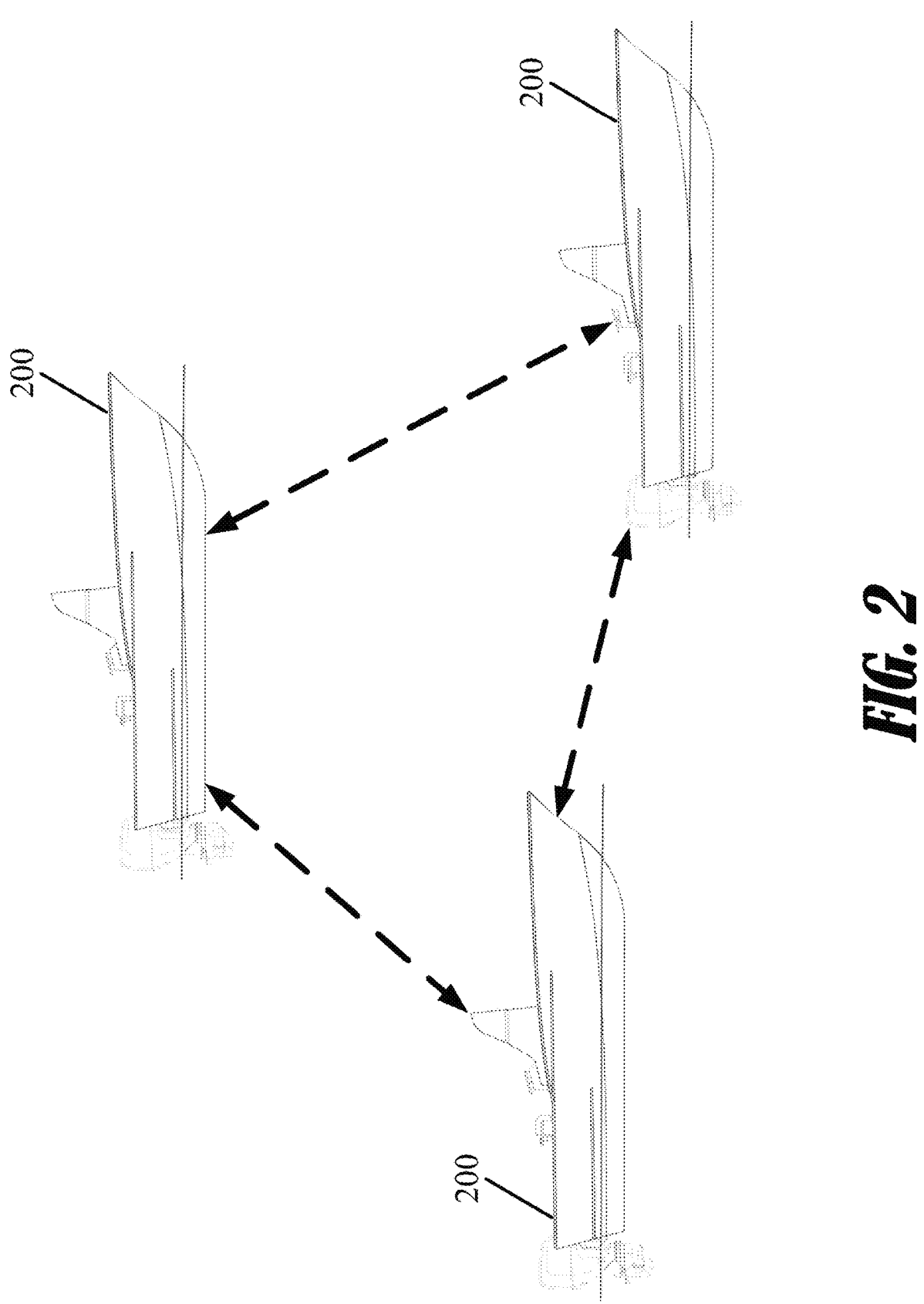
Figure 3:
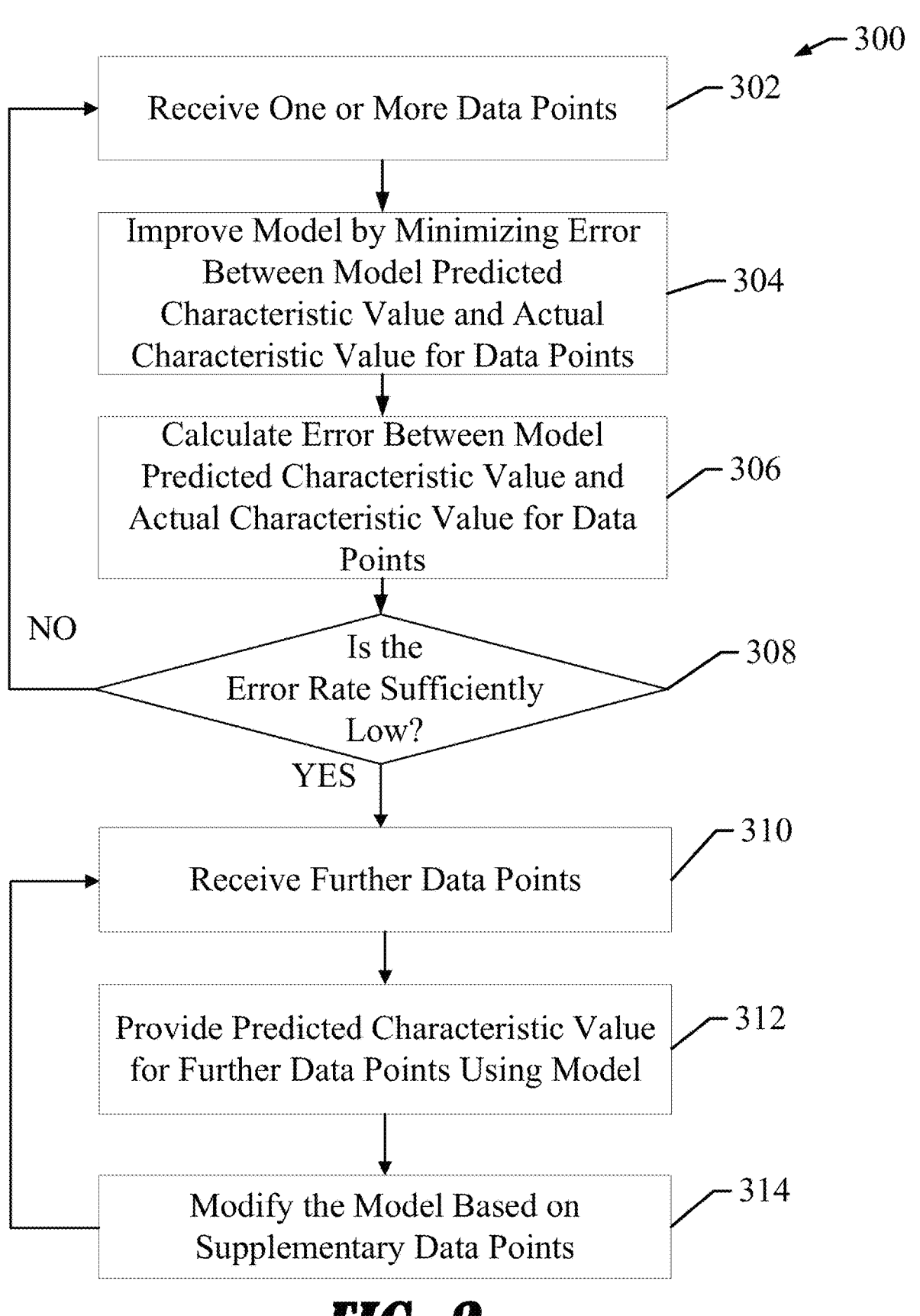
Figure 5A:
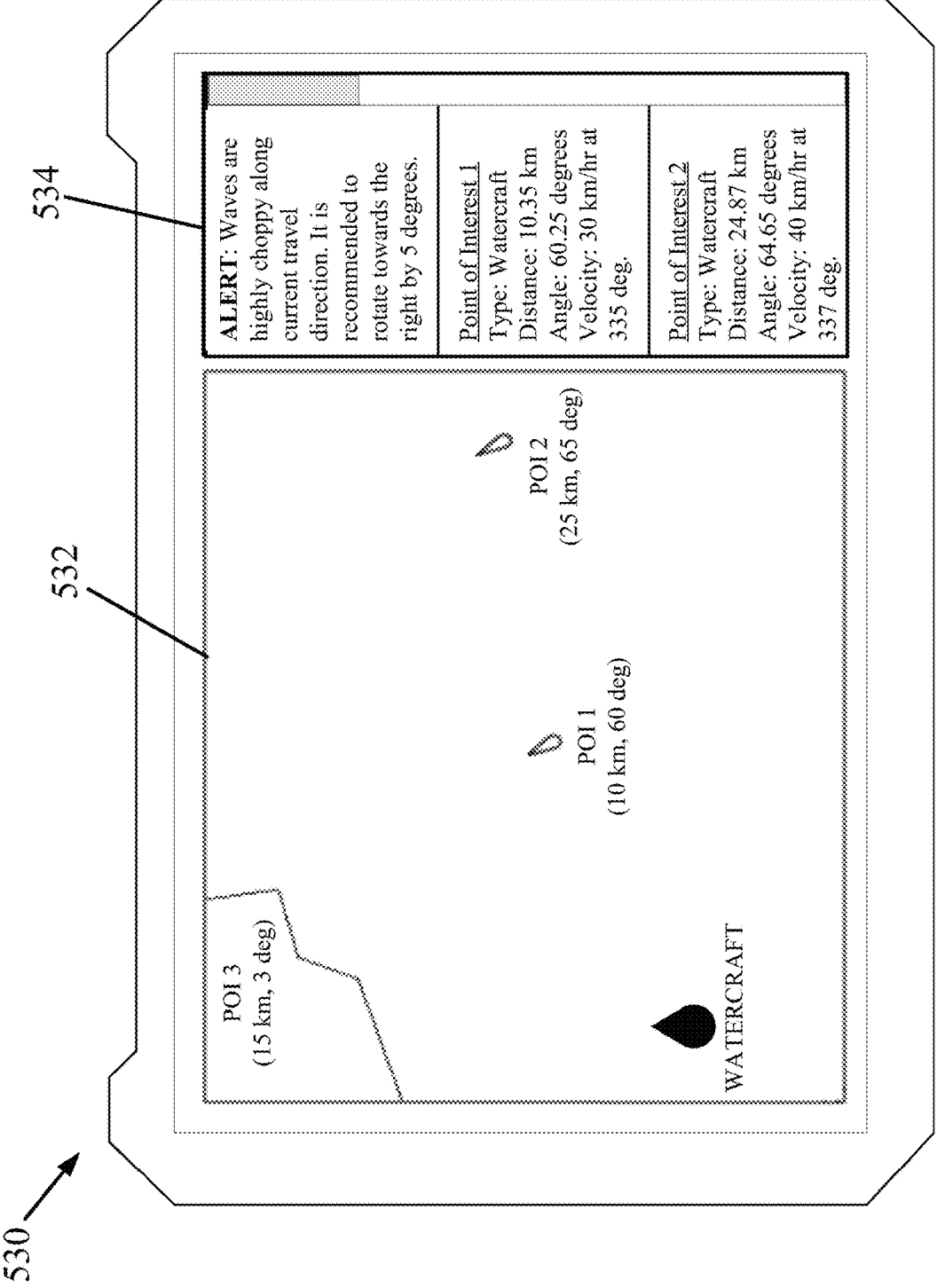
Figure 5B:
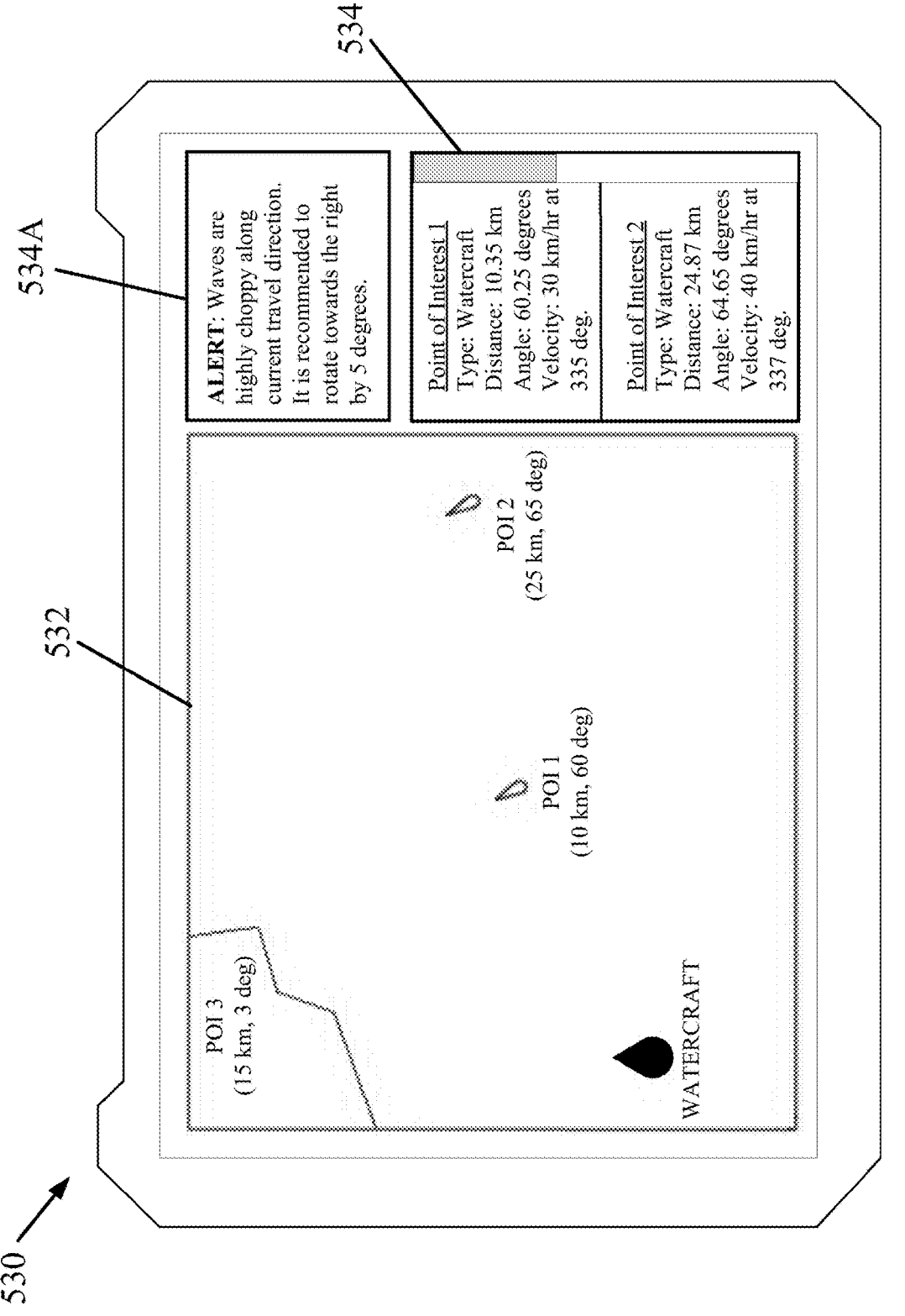
Figure 5C:
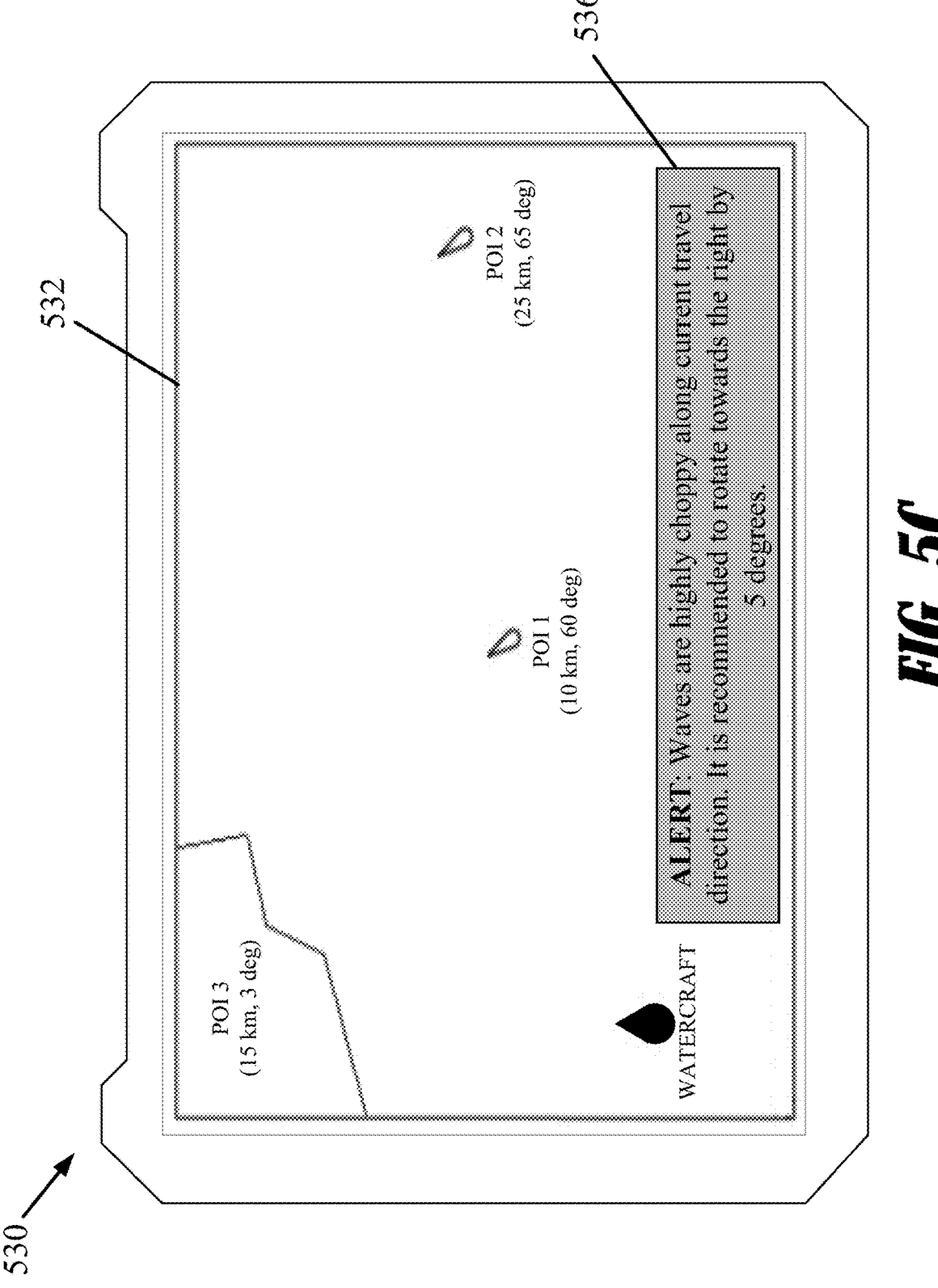
Figure 5D:
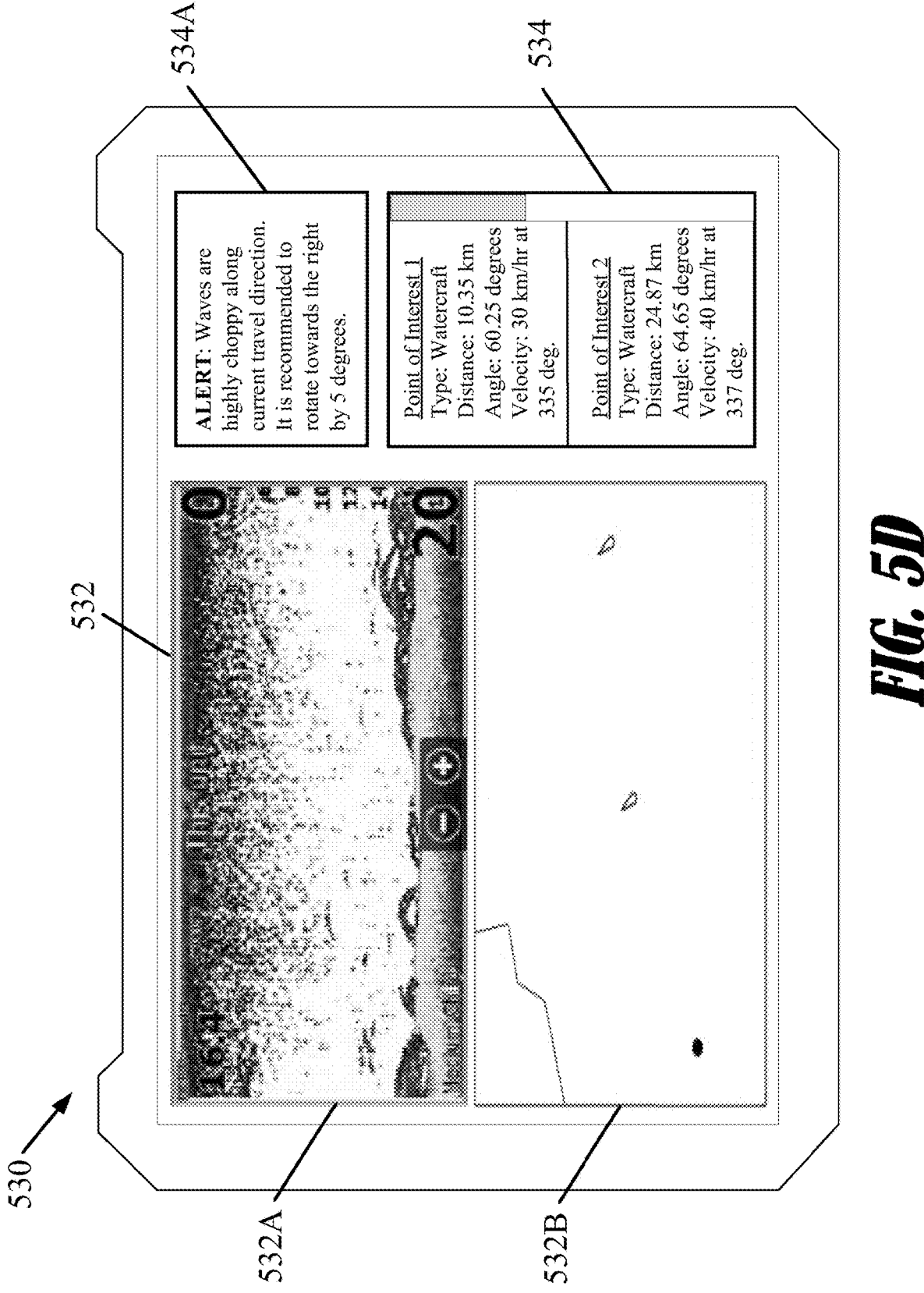
Figure 5E:
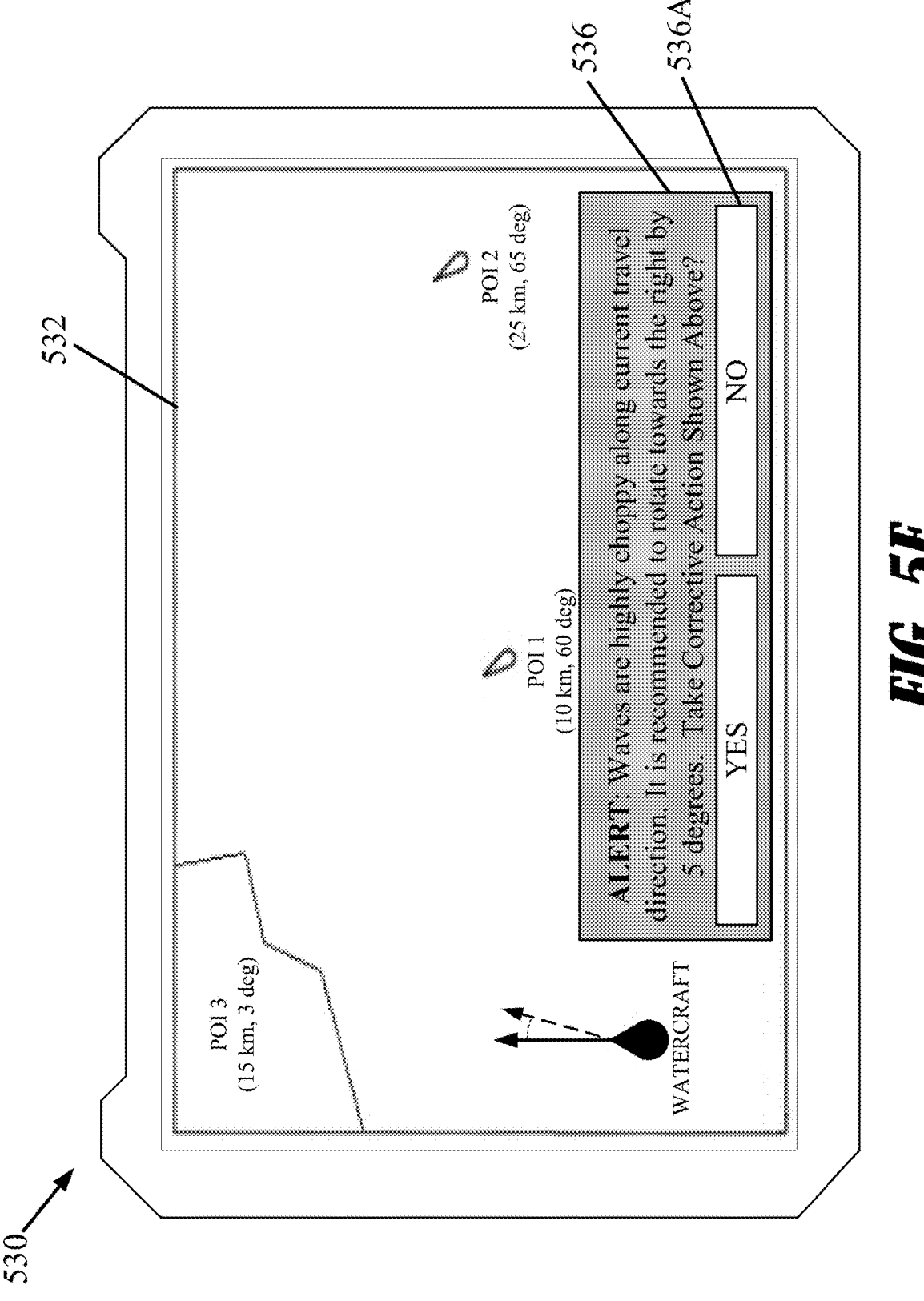
Figure 5F:
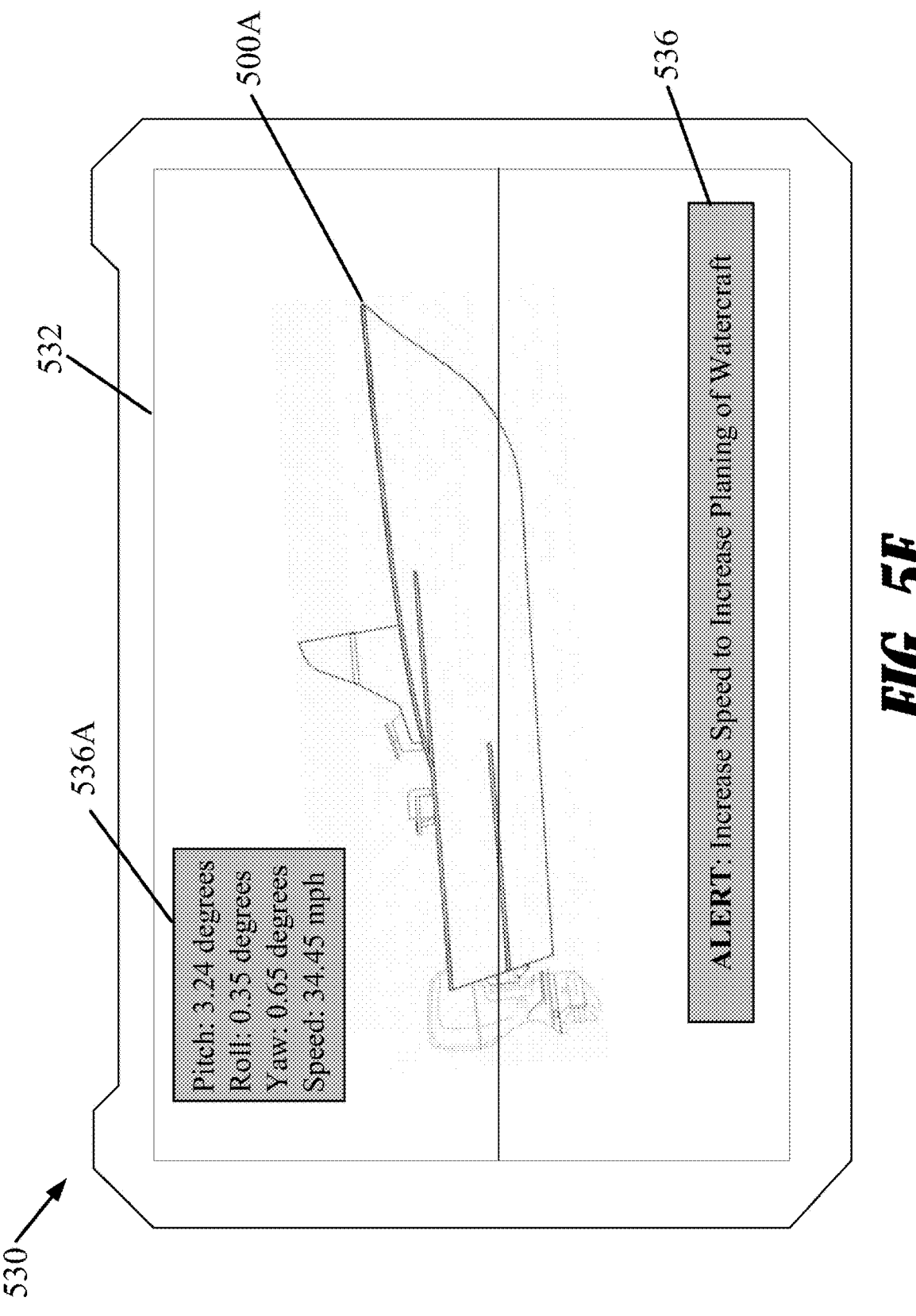
Figure 6:
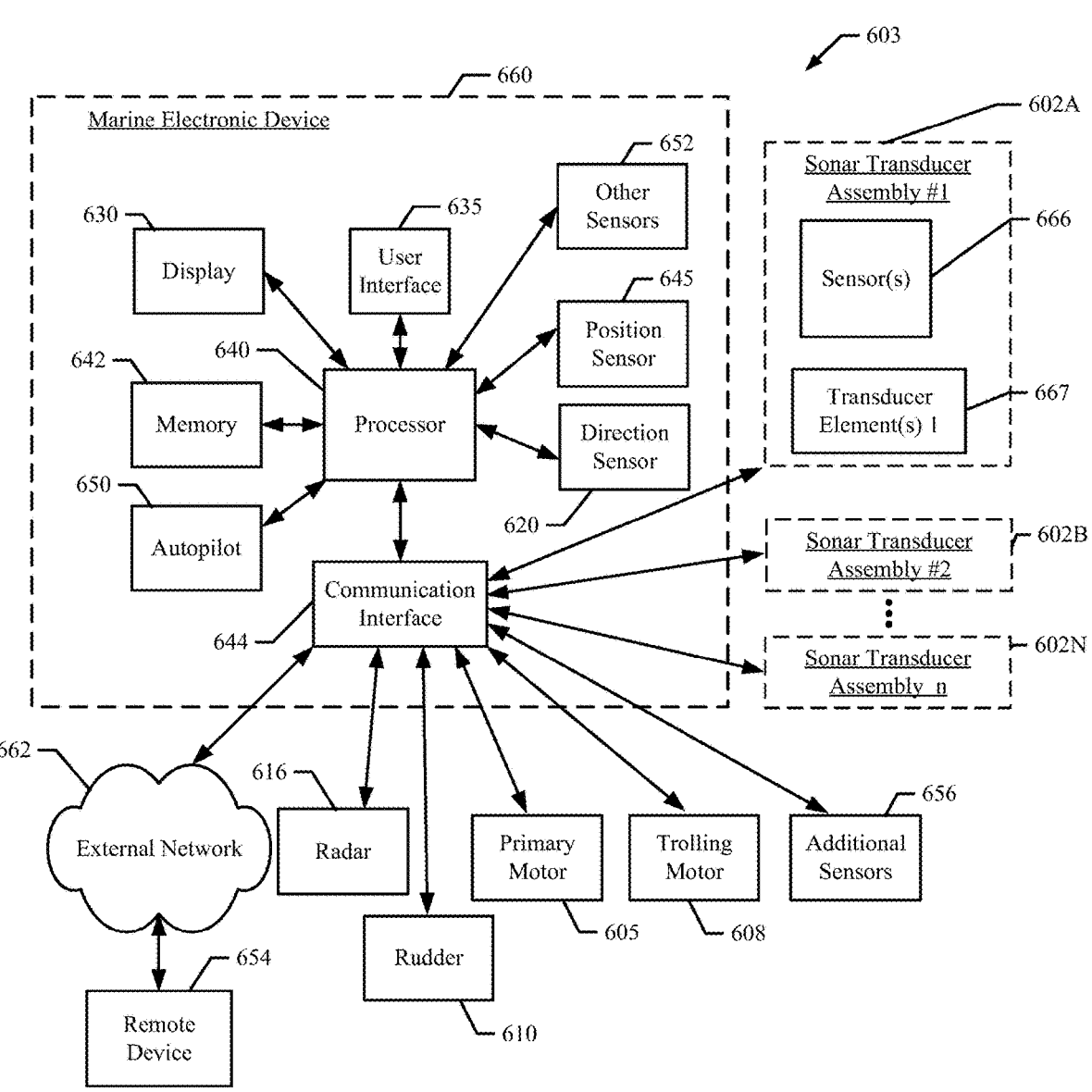

Having thus described the invention in general terms, reference will now be made to the accompanying drawings, which are not necessarily drawn to scale, and wherein:

FIG. 1A illustrates a side view of an example watercraft including various marine devices, in accordance with some embodiments discussed herein;

FIG. 1B illustrates a schematic view of an example watercraft with various types of motion for the watercraft illustrated, in accordance with some embodiments discussed herein;

FIG. 2 illustrates a schematic view of different watercraft in communication with one another, in accordance with some embodiments discussed herein;

FIG. 3 illustrates a flowchart of an example method of machine learning, in accordance with some embodiments discussed herein;

FIG. 4 illustrates a method for making dynamic routing decisions for a watercraft, in accordance with some embodiments discussed herein;

FIGS. 5A-5D illustrate schematic views of various example displays presenting an alert, in accordance with some embodiments discussed herein;

FIG. 5E illustrates a schematic view of an example display presenting an alert that recommends a watercraft operation change, in accordance with some embodiments discussed herein;

FIG. 5F illustrates a schematic view of an example display presenting an alert related to a planing level of the watercraft, in accordance with some embodiments discussed herein; and FIG. 6 illustrates a block diagram of an example system with various electronic devices, marine devices, and secondary devices shown, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. With the exception of reference numerals provided in FIGS. 3 and 4, like reference numerals refer to like elements throughout. For example, reference numerals 530 and 630 each refer to a display. Additionally, any connections or attachments may be direct or indirect connections or attachments unless specifically noted otherwise. Further, the embodiments included below are not necessarily drawn to scale.

FIG. 1A illustrates an example watercraft 100 including various marine devices, in accordance with some embodiments discussed herein. As depicted in FIG. 1A, the watercraft 100 (e.g., a vessel) is configured to traverse a marine environment, e.g. body of water 101, and may use one or more sonar transducer assemblies 102a, 102b, and 102c disposed on and/or proximate to the watercraft 100. Notably, example watercraft 100 contemplated herein may be surface watercraft, submersible watercraft, or any other implementation known to those skilled in the art. The sonar transducer assemblies 102a, 102b, and 102c may each include one or more sonar transducer elements configured to transmit sound waves into the body of water 101, receive sonar returns from the body of water 101, and convert the sonar returns into sonar return data. Various types of sonar transducers may be provided—for example, a linear downscan sonar transducer, a conical downscan sonar transducer, a sonar transducer array, or a sidescan sonar transducer may be used.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more sonar transducer assemblies (e.g., 102a, 102b, and/or 102c) may be mounted in various positions and to various portions of the watercraft 100 and/or equipment associated with the watercraft 100. For example, the sonar transducer assembly may be mounted to the transom 106 of the watercraft 100, such as depicted by sonar transducer assembly 102a. The sonar transducer assembly may be mounted to the bottom or side of the hull 104 of the watercraft 100, such as depicted by sonar transducer assembly 102b. The sonar transducer assembly may be mounted to the trolling motor 108, such as depicted by transducer assembly 102c.

The watercraft 100 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 100 although other places on the watercraft 100 are contemplated. Likewise, additionally or alternatively, a remote device (such as a user's mobile device) may include functionality of a marine electronic device.

The watercraft 100 may also comprise other components within the one or more marine electronic devices 160 or at the helm. In FIG. 1A, the watercraft 100 comprises a radar 116, which is mounted at an elevated position (although other positions relative to the watercraft 100 are also contemplated). The watercraft 100 also comprises an AIS transceiver 118, a direction sensor 120, and a camera 122, and these components are each positioned at or near the helm (although other positions relative to the watercraft 100 are also contemplated). Additionally, the watercraft 100 comprises a rudder 110 at the stern of the watercraft 100, and the rudder 110 may be positioned on the watercraft 100 so that the rudder 110 rests in the body of water 101. In other embodiments, some of these components may be integrated into the one or more electronic devices 160 or other devices. Another example device on the watercraft 100 includes a temperature sensor 112 that may be positioned so that it will rest within or outside of the body of water 101. Thus, the temperature sensor 112 may measure the air temperature or the temperature of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110. A position sensor may also be provided in the marine electronic device 160 or at another location. The position sensor may comprise a global positioning system (GPS), inertial navigation system, such as machined electromagnetic sensor (MEMS), a ring laser gyroscope, or another location detection system. Other sensors may also be provided on the watercraft 100, including but not limited to a current sensor, a light sensor, a wind sensor, an accelerometer, and a speed sensor. Other sensors may be provided to measure the pitch of the watercraft, a heave of the watercraft, a sway of the watercraft, a roll of the watercraft, a yaw of the watercraft, a speed of the watercraft, G-forces of the watercraft, acceleration of the watercraft, an autopilot drive activity, a drive load, or a rudder angle.

FIG. 1B illustrates a schematic view of an example watercraft 100 and various types of motion for the watercraft 100. Exemplary axes are illustrated in FIG. 1B, with an X-axis extending along the direction of travel for the watercraft 100, with the Z-axis extending in the vertical direction, and with the Y-axis extending in a direction that is perpendicular to the other two axes. As illustrated, rotation of the watercraft 100 about the X-axis may generate roll, rotation of the watercraft 100 about the Y-axis may generate pitch, and rotation of the watercraft 100 about the Z-axis may generate yaw. Furthermore, shifting of the watercraft 100 along the Y-axis may generate sway, and shifting of the watercraft 100 along the Z-axis may generate heave.

Using data from various sources, a weather profile may be created. The weather profile may be used to improve the handling of a vessel and to provide information for navigational routing decisions. The weather profile may use data from one or more onboard sensors (see, e.g., FIG. 6, position sensor 645, direction sensor 620, other sensors 652, etc.). For example, data may be obtained regarding the pitch, heave, roll, or yaw of the watercraft to obtain details regarding the movement of the watercraft, and this data may be compiled into a weather profile. The weather profile may also include data from onboard sensors such as air temperature measurements, water temperature measurements, a speed of the watercraft, G-forces of the watercraft, acceleration of the watercraft, autopilot drive activity, drive load, and rudder angles. However, the weather profile may be created using other sources of information, such as data that has been saved in memory 642 (see FIG. 6), data that has been retrieved from a remote device 654 (see FIG. 6) via an external network (see FIG. 6), data retrieved from different watercraft 200 (see FIG. 2), etc. Available data may be analyzed to create a weather profile. The weather profile may be generated at one or more processor(s) 640 (see FIG. 6) within a marine electronic device 660 (see FIG. 6), at a remote device 654 (see FIG. 6) connected to a marine electronic device 660 (see FIG. 6) via an external network 662 (see FIG. 6), or by some other device.

Various embodiments are also provided that enable effective communication between nearby watercraft even in remote areas lacking a connection to a network. By enabling these connections, data may be obtained at a watercraft from another watercraft, and this data may be used to form a weather profile. FIG. 2 illustrates a schematic view of different watercraft 200 in communication with one another. The different watercraft 200 may each gather information using its sensors and other devices, and the watercraft 200 may then share information with other nearby watercraft. In this way, the watercraft 200 may form a mesh network that permits the watercraft within the mesh network to have more data to use while analyzing data for generating weather profiles and/or potential watercraft operation changes. In some embodiments, each watercraft 200 may send information to and receive information from other watercraft. However, in other embodiments, some of the watercraft 200 may only send or receive information. In some embodiments, direct lines of communication may be established between two different watercraft.

By enabling the creation of a mesh network, information obtained from a watercraft at one location may be shared with nearby watercraft. Where the watercraft form direct lines of communication without use of any intermediary servers, information from one watercraft may be shared with other nearby watercraft, and the information may then be propagated to other watercraft at more remote locations over time. Where the watercraft form direct lines of communication without use of any intermediary servers, the watercraft and devices on the watercraft may not need any specific kind of configured connectivity—any meshed network that is formed may work in the background, and technology such as Bluetooth Low Energy (BLE), Wi-Fi, VHF Data Exchange System (VDES), Wi-Fi capable multi-functional displays (MFDs), Smart Hubs, and phones may serve as relay nodes. Watercraft and sensors and devices thereon may continuously collect data and store that data in memory. Some or all of this data may be periodically shared with other watercraft via the mesh network. To the extent that a watercraft loses a connection with other watercraft in the mesh network, the watercraft may continue collecting data and may eventually share the data once the connection has been restored or once a connection with another watercraft is created.

The creation of a mesh network may be beneficial to provide watercraft with an increased amount of relevant information. Watercraft are often used in areas having limited connectivity. Watercraft may be in areas without cellular network coverage such as oceans, lakes, or other areas. Furthermore, it may be expensive (e.g., in processing power, in power draw, in cost to the boater, etc.) to include a connectivity solution onboard. The marine electronic devices on a watercraft may enable the mesh network, and the mesh network may result in a significant increase in the amount of data that is available to make determinations regarding a weather profile and/or an appropriate watercraft operation change.

The creation of a mesh network may have many benefits. For example, a mesh network may be used to distribute updates to systems and components of a watercraft (e.g. MFDs, marine electronic devices, etc.). The various watercraft in the mesh network may distribute updates between each other, with MFDs, marine electronic devices, Smart Hubs, phones, or other devices being used as relay nodes.

In some embodiments, updates may be propagated across a mesh network using a torrent-style peer-to-peer (P2P) network. Data may be shared over the mesh network, and this data may be shared in small chunks of data in some cases. The mesh network and/or the data shared over the mesh network may be protected by encryption to increase the security of the mesh network. Furthermore, certain key information may be provided in the data or chunks of data that is shared over the mesh network, and this key information may be used to validate that the data or chunks of data are authentic updates. Additionally or alternatively, the data or the chunks of data may include a unique identifier and/or location information, with the unique identifier being unique to the watercraft from which the data or chunks of data was obtained and with the location information indicating the location of the same watercraft.

The weather profile may be analyzed, and operation changes may be determined based on the weather profile. These operation changes may be generated where analysis of the weather profile suggests that the ride conditions may be optimized, that the handling of the vessel may be improved, that the navigational route may be optimized, etc. For example, where the frequency or magnitude of movement of the watercraft (e.g. pitch, heave, roll, yaw, etc.) exceeds a certain level, then an appropriate operation change may be a change in the direction of the watercraft (e.g. five degrees to the right). As another example, the weather profile may be analyzed to identify the orientation and speed of the watercraft, and operation changes may be a change in speed of the watercraft to improve, for example, a planing level of the watercraft. As yet another example, information from the weather profile may be used to determine whether or not the ride conditions at the watercraft are milder or rougher than normal, and, to the extent that the conditions are rougher than normal, the operation changes may be proposed to reduce the speed of the watercraft or to dock the watercraft where the conditions are extremely rough. Any analysis may be conducted using algorithms saved in memory in some embodiments, but the analysis may be performed in other ways. For example, artificial intelligence or machine learning may be utilized to analyze data to determine appropriate operation changes, and these techniques may be beneficial to identify relationships between data that may not otherwise be identified.

In some embodiments, artificial intelligence and machine learning may be used to generate models to predict data that may be used to create a weather profile. FIG. 3 is a flowchart of an example method 300 of machine learning, such as may be utilized with artificial intelligence for various embodiments of the present invention. At least one processor or another suitable device may be configured to develop a model, such as described herein in various embodiments. In this regard, the developed model may be deployed and utilized to predict data that may be used to create a weather profile. In some embodiments, a marine electronic device 660 (see FIG. 6) may comprise one or more processors 640

(see FIG. 6) that perform the functions shown in FIG. 3. However, in other embodiments, a remote device 654 (see FIG. 6) such as a server or a remote computer may perform the functions shown in FIG. 3.

This system may beneficially use data or predict data that may be used to create a weather profile and/or determine potential watercraft operation changes. The system may do so by accounting for onboard sensor data and different types of additional data, and the developed model may assign different weights to different types of data that are provided. In some systems, even after the model is deployed, the systems may beneficially improve the developed model by analyzing further data points. By utilizing artificial intelligence, a novice user may benefit from the experience of the models utilized, making marine activities more user friendly and accessible/successful. Embodiments beneficially allow for accurate information to be provided that may form part of the current weather profile, and embodiments also allow for information about current weather profile to be shared with the user (such as on the display) so that the user may make well-informed decisions. Additionally, the techniques may also enable displays that allow novice users to quickly and easily decipher relevant data. Utilization of the model may prevent the need for a user to spend a significant amount of time reviewing sensor data and other information, freeing the user to perform other tasks and enabling performance and consideration of complex estimations and computations that the user could not otherwise solve on their own (e.g., the systems described herein may also be beneficial for even the most experienced users).

By receiving several different types of data, the example method 300 may be performed to generate complex models. The example method 300 may find relationships between different types of data that may not have been anticipated. By detecting relationships between different types of data, the method 300 may generate accurate models even where a limited amount of data is available.

In some embodiments, the model may be continuously improved even after the model has been deployed. Thus, the model may be continuously refined based on changes in the systems or in the environment over time, which provides a benefit as compared with other models that stay the same after being deployed. The example method 300 may also refine the deployed model to fine-tune weights that are provided to various types of data based on subtle changes in the watercraft and/or the environment. Where certain parts of the watercraft are replaced, modified, or damaged or where there are swift changes in the environment, the method 300 may continuously refine a deployed model to quickly account for the changes and provide a revised model that is accurate. By contrast, where a model is not continuously refined, changes to the watercraft or the surrounding environment may make the model inaccurate until a new model may be developed and implemented, and implementation of a new model may be very costly, time-consuming, and less accurate than a continuously refined model. Furthermore, because data may be provided from on-board sensors in the method 300, the method 300 may accurately and precisely detect swift changes in the environment—without any data from these on-board sensors, the data would have likely been provided for larger areas and would not be provided for the specific location of the watercraft.

At operation 302, one or more data points are received. These data points may or may not be the initial data points being received. These data points preferably comprise known data on a characteristic value (i.e. the characteristic that the model may be used to predict). For example, where the characteristic value is an estimated frequency or magnitude of sway for a watercraft, the data points provided at operation 302 will preferably comprise known data that corresponds to the sway of the watercraft and data corresponding to other factors that impact sway (e.g. speed, current, hull depth, etc.). Other data may be provided from onboard sensors and devices and also from additional data. The data points provided at operation 302 are preferably historical data points with verified values to ensure that the model generated is accurate. The data points may take the form of discrete data points. However, where the data points are not known at a high confidence level, a calculated data value may be provided, and, in some cases, a standard deviation or uncertainty value may also be provided to assist in determining the weight to be provided to the data value in generating a model. In this regard, the predicted characteristic value may be formed based on historical comparisons of the characteristic value and/or other data.

For example, where the characteristic value is the amount of sway for a watercraft, the model may be formed based on historical comparisons of the sway of a watercraft with other historical data, and a processor may be configured to utilize the developed model to determine an estimated sway for a watercraft. This model may be developed through machine learning utilizing artificial intelligence based on the historical comparisons of the sway data with other data from onboard devices and additional data. Alternatively, a model may be developed through artificial intelligence, and the model may be formed based on historical comparisons of sway data with other onboard data and/or additional data. A processor may be configured to use the model and input the onboard data and the additional data into the model to determine the sway properties. Additional data may be provided from a variety of sources, and additional data may, for example, be provided from a camera, a radar, a thermometer, a clock, a pressure sensor, a direction sensor, or a position sensor. While the amount of sway for a watercraft is one example of a characteristic value, other characteristic values may be used. For example, the characteristic value may be weather conditions at the current position of the watercraft (e.g. wave intensity or frequency, air pressure, etc.), ride conditions of the watercraft (e.g. choppy water, suboptimal hull depth, pitch of watercraft, etc.), or an operating condition of a component on the watercraft (e.g. engine performance or efficiency, damage or wear on underwater components, etc.).

At operation 304, a model is improved by minimizing error between a predicted characteristic value generated by the model and an actual characteristic value for data points. For example, where the model is being used to predict the amount of sway for the watercraft based on other factors, the error between the predicted sway properties and the actual sway properties may be minimized. In some embodiments, an initial model may be provided or selected by a user. The user may provide a hypothesis for an initial model, and the method 300 may improve the initial model. However, in other embodiments, the user may not provide an initial model, and the method 300 may develop the initial model at operation 304, such as during the first iteration of the method 300. The process of minimizing error may be similar to a linear regression analysis on a larger scale where three or more different variables are being analyzed, and various weights may be provided for the variables to develop a model with the highest accuracy possible. Where a certain variable has a high correlation with the characteristic value, that variable may be given increased weight in the model. For example, where data from maps are available, that data may be provided alongside with data from onboard sensors and devices, and the model may be optimized to give the map data its appropriate weight. In refining the model by minimizing the error between the predicted characteristic value generated by the model and the actual or known characteristic value, the component performing the method 300 may perform a very large number of complex computations. Sufficient refinement results in a more accurate model.

In some embodiments, the accuracy of the model may be checked. For example, at operation 306, the accuracy of the model is determined. This may be done by calculating the error between the model predicted characteristic value generated by the model and the actual characteristic value from the data points. In some embodiments, error may also be calculated before operation 304. By calculating the accuracy or the error, the method 300 may determine if the model needs to be refined further or if the model is ready to be deployed. Where the characteristic value is a qualitative value or a categorical value, the accuracy may be assessed based on the number of times the predicted value was correct. Where the characteristic value is a quantitative value, the accuracy may be assessed based on the difference between the actual value and the predicted value.

At operation 308, a determination is made as to whether the calculated error is sufficiently low. A specific threshold value may be provided in some embodiments. For example, where the characteristic value is a magnitude of sway for a watercraft, the threshold may be 5 centimeters, and the calculated error may be sufficiently low if the average error is less than or equal to 3 centimeters. However, other threshold values may be used, and the threshold value may be altered by the user in some embodiments. If the error rate is not sufficiently low, then the method 300 may proceed back to operation 302 so that one or more additional data points may be received. If the error rate is sufficiently low, then the method 300 proceeds to operation 310. Once the error rate is sufficiently low, the training phase for developing the model may be completed, and the implementation phase may begin where the model may be deployed to predict the characteristic value.

By completing operations 302, 304, 306, and 308, a model may be refined through machine learning utilizing artificial intelligence based on the historical comparisons of a characteristic value with other onboard data and/or additional data and based on known deviations of the characteristic value for the historical comparisons. Notably, example model generation and/or refinement may be accomplished even if the order of these operations is changed, if some operations are removed, or if other operations are added.

During the implementation phase, the model may be utilized to provide a determined characteristic value. An example implementation of a model is illustrated from operations 310-312. In some embodiments, the model may be modified (e.g., further refined) based on the received data points, such as at operation 314.

At operation 310, further data points are received. For these further data points, the actual characteristic value may not be known. At operation 312, the model may be used to provide a predicted characteristic value for the further data points. Thus, the model may be utilized to determine the characteristic value.

At operation 314, the model may be modified based on supplementary data points, such as those received during operation 310 and/or other data points. For example, the model may be refined utilizing the data regarding the characteristic value, onboard data, and additional data, such as described herein. By providing supplementary data points, the model can continuously be improved even after the model has been deployed. The supplementary data points may be the further data points received at operation 310, or the supplementary data points may be provided to the processor from some other source. In some embodiments, the processor(s) or other component performing the method 300 may receive additional data from secondary devices and verify the further data points received at operation 310 using this additional data. By doing this, the method 300 may prevent errors in the further data points from negatively impacting the accuracy of the model.

In some embodiments, supplementary data points are provided to the processor from some other source and are utilized to improve the model. For example, supplementary data points may be saved to a memory 642 (see FIG. 6) associated with at least one processor 640 via communication interface 644, or the supplementary data points may be sent through the external network 662 from a remote device 654. These supplementary data points may be verified before being provided to the processor(s) 640 to improve the model, or the processor(s) 640 may verify the supplementary data points utilizing additional data.

As indicated above, in some embodiments, operation 314 is not performed and the method proceeds from operation 312 back to operation 310. In other embodiments, operation 314 occurs before operation 312 or simultaneous with operation 312. Upon completion, the method 300 may return to operation 310 and proceed on to the subsequent operations. Supplementary data points may be the further data points received at operation 310 or some other data points.

The model generated by method 300 may be used to predict accurate data that may form part of a weather profile and/or determine potential watercraft operation changes. A weather profile may include various types of data related to weather around the watercraft, movement characteristics of the watercraft, and/or operation of the watercraft. Based on the weather profile, for example, watercraft operation changes may be determined, such as may lead to a better user experience in the current weather. This may be done through the use of algorithms or look-up tables that use data from the weather profile, through the use of machine learning, or through the use of artificial intelligence.

While various systems, marine electronic devices, and other features for making dynamic routing decisions for a watercraft are contemplated, various embodiments involving a method of using these systems, marine electronic devices, other features, etc. are also contemplated. FIG. 4 illustrates a method 400 for making dynamic routing decisions for a watercraft. At operation 402, sensor data and/or external data may be received. Sensor data may be received from sensors located on the watercraft. Sensor data may be received from, for example, a radar, a position sensor, a direction sensor, a sonar transducer element, an air temperature sensor, a water temperature sensor, a current sensor, a light sensor, a wind sensor, an accelerometer, or a speed sensor. However, sensor data may be received from other sensors or components as well. Sensor data may be related to, for example, a pitch of the watercraft, a heave of the watercraft, a roll of the watercraft, a yaw of the watercraft, a speed of the watercraft, G-forces of the watercraft, acceleration of the watercraft, an autopilot drive activity, a drive load, a rudder angle, a sail angle, external forces acting on boat (including direction, magnitude, and/or frequency), fuel levels or fuel consumption, engine load, or wind angle or wind speed. However, sensor data may be related to other parameters.

Furthermore, the external data may be received from sources that are not located on the watercraft, and the external data may be received in a variety of ways. For example, the external data may be received from a second watercraft in some embodiments (see, e.g., FIG. 2), the external data may be received via an external network 662 (see FIG. 6) from remote servers, etc. External data may include, for example, at least one of external humidity data, external temperature data, external pressure data, external precipitation data, external water current data, external weather data, external sonar data, external GPS data, external compass data, external heading sensor data, external position data from a second watercraft, external directional data from a second watercraft, external directional data from a motor or a rudder of a second watercraft, external image data from a camera, external data regarding the date or time, external navigational data, or external geographical data. In some embodiments, other data may be received at operation 402 from onboard devices, such as from memory 642 (see FIG. 6). For example, external data may be saved in memory, and that data may then be received at operation 402.

At operation 404, a weather profile may be created based on the sensor data and/or the external data. In some embodiments, the weather profile may be created based on only the sensor data. In other embodiments, the weather profile may simply be created based on only the external data. The weather profile may be specific to a current position of the watercraft. The weather profile may also be created based on data from other onboard devices such as memory 642 (see FIG. 6).

At operation 406, one or more watercraft operation changes may be determined based on the weather profile. The watercraft operation changes may include, for example, a change in speed for the watercraft, a change in power level at a motor, a change in direction of the watercraft, a change in direction for the motor, rotation of a rudder, raising the motor, lowering the motor, rotation of a sail, raising other underwater components, or lowering the other underwater components. However, other watercraft operation changes may be made. At operation 408, the method 400 may including causing, such as through one or more systems or components of the watercraft, the one or more watercraft operation changes to occur.

At operation 410, the method 400 may include causing an alert to be created. The alert may be related to the one or more watercraft operation changes in some embodiments. However, the alert may be related to certain weather profile data, sensor data, external data, etc. In some embodiments, the alert may include a proposed watercraft operation change (see, e.g., FIG. 5E). Alternatively, the alert may indicate that the watercraft operation change was already made where the watercraft operation change is automatically made without authorization from the user. At operation 412, the method may include causing the alert to be presented on a display (see, e.g., FIGS. 5A-5F).

At operation 414, weather profile data may be generated. The weather profile data may be related to the weather profile. For example, the weather profile data may include a subset of the information provided in the weather profile (e.g. magnitude or frequency of heave). At operation 416, the method may include causing presentation of the weather profile data and/or the external data on the display.

The method 300 of FIG. 3 and the method 400 of FIG. 4 are merely exemplary, and the operations of these methods may be performed in any order unless otherwise noted. For example, operation 408 may be performed after operation 410 in some embodiments. Furthermore, certain operations of the method 300 and the method 400 may be performed simultaneously in some embodiments. For example, in the method 400 of FIG. 4, operations 412 and 416 may be performed simultaneously so that the presentation of an alert on a display may be caused at the same time that the presentation on a display of weather profile data and/or external data may be caused. Additionally, certain operations of the methods may be omitted or certain operations may be added to the methods. For example, the method 400 of FIG. 4 may be performed in some cases without performing operations 414 and 416.

FIGS. 5A-5D illustrate schematic views of various example displays 530 presenting an alert. Looking first at FIG. 5A, a display 530 is illustrated with a first area 532 and a second area 534. The first area 532 may present a wide variety of images or information. In the illustrated embodiments, the first area 532 is illustrating a radar image, but the first area 532 may illustrate other images such as a sonar image (which may be generated from side scan, forward scan, or other types of sonar transducer assemblies), maps, topographical data and charts, etc. Furthermore, the first area 532 may show other information such as data in some embodiments.

In the illustrated embodiment of FIG. 5A, a second area 534 is included. This second area 534 is provided separate from the first area 532, and the second area 534 is presenting additional information and data. Similar to the first area 532, a wide variety of information, images, data, etc. may be provided in the second area 534. In the illustrated embodiment, an alert is provided in the second area 534. This alert is provided alongside other information in the second area 534, and the alert may be emphasized relative to other information in some embodiments (e.g. by using bold letters, by changing color of area proximate to the alert, by using a different font size, etc.).

The alert may be related to one or more watercraft operation changes for a watercraft. In the embodiment illustrated in FIG. 5A, the alert is indicating that the watercraft is currently experiencing choppy waves in the current travel direction. This may be related to the frequency and/or magnitude of the movement of the watercraft (e.g. sway, heave, yaw, pitch, roll, etc.). Based on data that is received, the systems may provide a recommended watercraft operation change to turn the watercraft towards the right by five (5) degrees to improve the riding experience. However, other alerts may be provided. These alerts may be related to excessive or insufficient speeds for the watercraft. For example, the watercraft may not be moving at a sufficient speed to enable effective planing action for the watercraft. Additionally, alerts may be related to bad wave action (e.g. waves striking the watercraft at an angle that makes navigation less comfortable for passengers). Alerts may also be related to other issues such as the need for an adjustment of sails, high amounts of force acting on underwater components (e.g. a rudder or trolling motor), depth of hull being suboptimal, low energy being output by motor, low efficiency of motor, etc. These alerts are merely exemplary, and a wide variety of other alerts may be provided.

In some embodiments, a position sensor or some other sensor may detect variations in the position and movement of the watercraft. For example, variations in the amount of heave (in the vertical direction for a watercraft) or sway (in the side-to-side direction for a watercraft) may be detected. From this data, the intensity and/or the frequency of the movement may be determined and the systems may determine whether the data suggests that there is a high-risk of sea sickness for passengers onboard the watercraft. Where there is a high risk, an alert may be generated. Additionally, a recommended watercraft operation change may be generated, and the appropriate change may be determined using the aforementioned data as well as other data that is available. The recommended watercraft operation change may be to increase or decrease the speed (e.g. to change the planing action of the watercraft), to change the power level for a motor, to change the direction of a watercraft, a motor, or a rudder, etc.

Other watercraft operation changes may be determined and/or implemented. For example, potential watercraft operation changes may be determined to take a particular route to avoid head seas, and this may reduce fatigue of any crew or passengers onboard while also reducing the potential for damage to the watercraft.

Alerts may be generated and presented on a display. The weather profile may be analyzed, and alerts may be generated based on any notable findings of the analysis that is conducted. These alerts may, for example, be generated where analysis of the weather profile suggests that the ride conditions are suboptimal or that some operational change should be taken to optimize ride conditions. For example, where the frequency or magnitude of movement of the watercraft (e.g. pitch, heave, roll, yaw, etc.) exceeds a certain level, then an alert may be presented on the display to inform the operator of the conditions and/or provide potential operation changes. Alerts may be generated with other information, such as the operating condition of a component on the watercraft, the conditions at the current position of the watercraft and whether those conditions are mild or rough compared to a typical day, etc. Any analysis may be conducted using algorithms or look-up tables saved in memory in some embodiments, but the analysis may be performed in other ways. For example, artificial intelligence or machine learning may be utilized to analyze data to determine appropriate alerts, and these techniques may be beneficial to identify relationships between data that may not otherwise be identified.

While FIG. 5A illustrates one example approach for presenting an alert, other figures illustrate alternative approaches for the presentation of such an alert. In the illustrated embodiment of FIG. 5B, a second area 534 and a third area 534A are provided. In this embodiment, the first area 532, the second area 534, and the third area 534A are provided separate from each other. Furthermore, the second area 534 may show additional data, and the third area 534A may be dedicated to showing alert information. In FIG. 5C, the alert is presented in a pop-up window 536, and this pop-up window 536 may be superimposed on top of the information presented in the first area 532. In FIG. 5D, the first area 532 may provide a split-screen view with a first portion 532A presenting a first image and with a second portion 532B presenting a second image. Furthermore, the alert is presented in the third area 534A, which may be dedicated to showing alert information. While the first area 532, the second area 534, and the third area 534A are spaced apart from each other in the illustrated embodiments, these areas may not be spaced apart from each other in other embodiments, and the areas may simply be provided in the same display panel in split-screens.

FIG. 5E illustrates a schematic view of an example display presenting an alert that recommends a watercraft operation change. In the illustrated embodiment, the alert is provided in the pop-up window 536, and the pop-up window 536 includes buttons 536A. A user may select one of the buttons 536A to cause the recommended watercraft operation change to be implemented or rejected. For example, where a user selects the yes button 536A in FIG. 5E, the systems or one or more processors within the systems may cause the watercraft to rotate to the right by 5 degrees (e.g. by changing the direction of the rudder, a motor, etc.). Where the user selects the no button 536A in FIG. 5E, the systems or one or more processors within the systems may refrain from causing the watercraft to rotate, and the user may turn the watercraft manually or the user may reject the recommended watercraft operation change altogether and continue along the current travel direction. Additionally, the image within the first area 532 may be modified based on the recommended watercraft operation change. For example, FIG. 5E illustrates an arrow showing the current travel direction as well as the travel direction if the watercraft operation change is taken.

FIG. 5F illustrates a schematic view of an example display 530 presenting an alert related to the planing level of the watercraft. In the illustrated embodiment, the alert is presented in a pop-up window 536, but the alert may be presented in other ways (see, e.g., FIGS. 5A-5D). A second pop-up window 536A is also provided, with this second pop-up window 536A providing information regarding the pitch, the roll, the yaw, and the speed of the watercraft. Additionally, the first area is configured to present a representation 500A of the watercraft. As the watercraft starts moving at higher speeds, the watercraft may begin planing. This may result in the watercraft rising up slightly relative to the waterline of the body of water in which the watercraft rests. Planing may also result in a change in the pitch of the watercraft. As illustrated in FIG. 5F, the representation 500A of the watercraft has a different pitch than the watercraft 100 of FIG. 1A, with the representation 500A being rotated slightly more in the counterclockwise direction (when viewed from the perspective illustrated in FIG. 5F).

In some embodiments, the systems described herein may take some watercraft operation changes automatically without asking. For example, if the watercraft is traveling above a certain speed or if the water current exceeds a certain level, the system may automatically cause a trolling motor or another underwater object to be elevated. However, other automatic changes may be made. Where automatic changes are made, a notification or alert may be presented to inform the user.

FIG. 6 illustrates a block diagram of an example system 603 according to various embodiments of the present invention described herein. The system 603 advantageously provides for the use of a wide variety of inputs, and these inputs may be utilized to receive data that may be used to assist in the determination of outputs. This also permits inputs to be provided via several different means, as devices may communicate with a processor 640 within a marine electronic device 660 via a wired connection, a wireless connection, or a connection through an external network.

The illustrated system 603 includes a marine electronic device 660. The system 603 may comprise numerous marine devices. As shown in FIG. 6, one or more sonar transducer assemblies 602A, 602B, 602N may be provided. A radar 616, a rudder 610, a primary motor 605, a trolling motor 608, and additional sensors/devices 656 may also be provided as marine devices, but other marine devices may be provided as well. One or more marine devices may be implemented on the marine electronic device 660. For example, a position sensor 645, a direction sensor 620, an autopilot 650, and other sensors 652 may be provided within the marine electronic device 660. These marine devices can be integrated within the marine electronic device 660, integrated on a watercraft at another location and connected to the marine electronic device 660, and/or the marine devices may be implemented at a remote device 654 in some embodiments. The system 603 may comprise any number of different systems, modules, or components, and each of these may include any device or means embodied in either hardware, software, or a combination of hardware and software configured to perform one or more corresponding functions described herein.

The marine electronic device 660 may include at least one processor 640, a memory 642, a communication interface 644, a user interface 635, a display 630, autopilot 650, and one or more sensors (e.g. position sensor 645, direction sensor 620, other sensors 652). One or more of the components of the marine electronic device 660 may be located within a housing or could be separated into multiple different housings (e.g., be remotely located).

The processor(s) 640 may be any means configured to execute various programmed operations or instructions stored in a memory device (e.g., memory 642) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor(s) 640 as described herein. In this regard, the processor(s) 640 may be configured to analyze electrical signals communicated thereto to provide or receive sonar data from one or more sonar transducer assemblies and additional (e.g., secondary) data from other sources. For example, the processor(s) 640 may be configured to receive data from onboard sensors and additional data, determine an expected output value, and/or determine a watercraft operation change.

In some embodiments, the processor(s) 640 may be further configured to implement signal processing. In some embodiments, the processor(s) 640 may be configured to perform enhancement features to improve the display characteristics of data or images, collect or process additional data, such as time, temperature, GPS information, waypoint designations, or others, or may filter extraneous data to better analyze the collected data. The processor(s) 640 may further implement notices and alarms, such as those determined or adjusted by a user, to reflect proximity of other objects (e.g., represented in sonar data), to reflect proximity of other vehicles (e.g. watercraft), approaching storms, etc.

In an example embodiment, the memory 642 may include one or more non-transitory storage or memory devices such as, for example, volatile and/or non-volatile memory that may be either fixed or removable. The memory 642 may be configured to store instructions, computer program code, sonar data, and additional data such as radar data, chart data, location/position data in a non-transitory computer readable medium for use, such as by the processor(s) 640 for enabling the marine electronic device 660 to carry out various functions in accordance with example embodiments of the present invention. For example, the memory 642 could be configured to buffer input data for processing by the processor(s) 640. Additionally or alternatively, the memory 642 could be configured to store instructions for execution by the processor(s) 640.

The communication interface 644 may be configured to enable communication to external systems (e.g. an external network 662). In this manner, the marine electronic device 660 may retrieve stored data from a remote device 654 via the external network 662 in addition to or as an alternative to the onboard memory 642. Additionally or alternatively, the marine electronic device 660 may transmit or receive data, such as sonar signal data, sonar return data, sonar image data, or the like to or from a sonar transducer assembly 602A, 602B, 602N. In some embodiments, the marine electronic device 660 may also be configured to communicate with other devices or systems (such as through the external network 662 or through other communication networks, such as described herein). For example, the marine electronic device 660 may communicate with a propulsion system of the watercraft 100 (see FIG. 1A) (e.g., for autopilot control); a remote device (e.g., a user's mobile device, a handheld remote, etc.); or another system. Using the external network 662, the marine electronic device may communicate with and send and receive data with external sources such as a cloud. The marine electronic device may send and receive various types of data. For example, the system may receive weather data, data from other fish locator applications, alert data, etc. However, this data is not required to be communicated using external network 662, and the data may instead be communicated using other approaches, such as through a physical or wireless connection via the communications interface 644.

The communications interface 644 of the marine electronic device 660 may also include one or more communications modules configured to communicate with one another in any of a number of different manners including, for example, via a network. In this regard, the communications interface 644 may include any of a number of different communication backbones or frameworks including, for example, Ethernet, the NMEA 2000 framework, GPS, cellular, Wi-Fi, Bluetooth, Bluetooth Low Energy ("BLE") or other suitable networks. The network may also support other data sources, including GPS, autopilot, engine data, compass, radar, etc. In this regard, numerous other peripheral devices (including other marine electronic devices or sonar transducer assemblies) may be included in the system 603.

The position sensor 645 may be configured to determine the current position and/or location of the marine electronic device 660 (and/or the watercraft 100 (see FIG. 1A)). For example, the position sensor 645 may comprise a GPS, bottom contour, inertial navigation system, such as machined electromagnetic sensor (MEMS), a ring laser gyroscope, or other location detection system. Alternatively or in addition to determining the location of the marine electronic device 660 or the watercraft 100, the position sensor 645 may also be configured to determine the position and/or orientation of an object outside of the watercraft 100.

The display 630 (e.g. one or more screens) may be configured to present images and may include or otherwise be in communication with a user interface 635 configured to receive input from a user. The display 630 may be, for example, a conventional LCD (liquid crystal display), a touch screen display, mobile device, or any other suitable display known in the art upon which images may be displayed.

In some embodiments, the display 630 may present one or more sets of data (or images generated from the one or more sets of data). Such data includes chart data, radar data, sonar data, weather data, location data, position data, orientation data, sonar data, or any other type of information relevant to the watercraft. Sonar data may be received from one or more sonar transducer assemblies 602A, 602B, 602N or from sonar devices positioned at other locations, such as remote from the watercraft. Additional data may be received from marine devices such as a radar 616, a primary motor 605 or an associated sensor, a trolling motor 608 or an associated sensor, an autopilot 650, a rudder 610 or an associated sensor, a position sensor 645, a direction sensor 620, other sensors 652, a remote device 654, onboard memory 642 (e.g., stored chart data, historical data, etc.), or other devices.

In some further embodiments, various sets of data, referred to above, may be superimposed or overlaid onto one another. For example, a route representation may be applied to (or overlaid onto) a chart (e.g. a map or navigational chart). Additionally or alternatively, depth information, weather information, radar information, sonar information, or any other navigation system inputs may be applied to one another.

The user interface 635 may include, for example, a keyboard, keypad, function keys, mouse, scrolling device, input/output ports, touch screen, or any other mechanism by which a user may interface with the system.

Although the display 630 of FIG. 6 is shown as being directly connected to the processor(s) 640 and within the marine electronic device 660, the display 630 could alternatively be remote from the processor(s) 640 and/or marine electronic device 660. Likewise, in some embodiments, the position sensor 645 and/or user interface 635 could be remote from the marine electronic device 660.

The marine electronic device 660 may include one or more other sensors/devices 652, such as configured to measure or sense various other conditions. The other sensors/devices 652 may include, for example, an air temperature sensor, a water temperature sensor, a current sensor, a light sensor, an accelerometer, a wind sensor, a speed sensor, or the like.

The sonar transducer assemblies 602A, 602B, 602N illustrated in FIG. 6 may include one or more sonar transducer elements 667, such as may be arranged to operate alone or in one or more transducer arrays. In some embodiments, additional separate sonar transducer elements (arranged to operate alone, in an array, or otherwise) may be included. As indicated herein, the sonar transducer assemblies 602A, 602B, 602N may also include a sonar signal processor or other processor (although not shown) configured to perform various sonar processing. In some embodiments, the processor (e.g., at least one processor 640 in the marine electronic device 660, a controller (or processor portion) in the sonar transducer assemblies 602A, 602B, 602N, or a remote controller—or combinations thereof) may be configured to filter sonar return data and/or selectively control transducer element(s) 667. For example, various processing devices (e.g., a multiplexer, a spectrum analyzer, A-to-D converter, etc.) may be utilized in controlling or filtering sonar return data and/or transmission of sonar signals from the transducer element(s) 667.

The sonar transducer assemblies 602A, 602B, 602N may also include one or more other systems, such as various sensor(s) 666. For example, the sonar transducer assemblies 602A, 602B, 602N may include an orientation sensor, such as gyroscope or other orientation sensor (e.g., accelerometer, MEMS, etc.) that can be configured to determine the relative orientation of the sonar transducer assemblies 602A, 602B, 602N and/or the one or more sonar transducer element(s) 667—such as with respect to a forward direction of the watercraft. In some embodiments, additionally or alternatively, other types of sensor(s) are contemplated, such as, for example, a water temperature sensor, a current sensor, a light sensor, a wind sensor, an accelerometer, a speed sensor, or the like.

The components presented in FIG. 6 may be rearranged to alter the connections between components. For example, in some embodiments, a marine device outside of the marine electronic device 660, such as the radar 616, may be directly connected to the processor(s) 640 rather than being connected to the communication interface 644. Additionally, sensors and devices implemented within the marine electronic device 660 may be directly connected to the communications interface in some embodiments rather than being directly connected to the processor(s) 640.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for making dynamic routing decisions for a watercraft, the system comprising:

one or more sensors located on the watercraft that are configured to provide sensor data while the watercraft is actively being used in a first voyage, wherein the sensor data includes at least one of a pitch of the watercraft, a heave of the watercraft, a roll of the watercraft, a yaw of the watercraft, G-forces of the watercraft, an autopilot drive activity, a drive load, or a rudder angle, wherein the one or more sensors include at least one of a radar, a direction sensor, a sonar transducer element, an air temperature sensor, a water temperature sensor, a current sensor, a light sensor, or a wind sensor;

a processor located on the watercraft; and a memory located on the watercraft, wherein the memory includes computer program code configured to, when executed, cause the processor to:

receive the sensor data;

create a weather profile based on the sensor data from the one or more sensors located on the watercraft, and without using any external data, wherein the weather profile is specific to a current position of the watercraft;

make a determination of one or more watercraft operation changes based on the weather profile, wherein the one or more watercraft operation changes includes at least one of a change in power level at a motor, a change in direction of the watercraft, a change in direction for the motor, rotation of a rudder, raising the motor, lowering the motor, rotation of a sail, raising other underwater components, or lowering the other underwater components;

generate, as part of the weather profile, a current ride-comfort characteristic value using the sensor data and a model developed through artificial intelligence, the model being formed based on historical correlations between sensor data from the one or more sensors and a ride-comfort characteristic value indicative of passenger comfort or sea-sickness risk;

compare the current ride-comfort characteristic value to a predetermined comfort threshold; and make, when the current ride-comfort characteristic value exceeds the comfort threshold, the one or more watercraft operation changes based on the determination while the watercraft is actively being used during the first voyage.

2. The system of claim 1, wherein the computer program code is configured to, when executed, cause the processor to:

cause an alert to be created, wherein the alert is related to the one or more watercraft operation changes.

3. The system of claim 2, further comprising:

a display;

wherein the computer program code is configured to, when executed, cause the processor to:

cause the alert to be presented on the display.

4. The system of claim 1, further comprising:

a display, wherein the computer program code is configured to, when executed, cause the processor to:

generate weather profile data related to the weather profile; and cause presentation on the display of the weather profile data.

5. The system of claim 1, wherein the computer program code is configured to, when executed, cause the processor to receive external data from a data source that is not located on the watercraft.

6. The system of claim 5, wherein the computer program code is configured to, when executed, cause the processor to create the weather profile using the sensor data and the external data.

7. The system of claim 6, wherein the external data includes at least one of external humidity data, external temperature data, external pressure data, external precipitation data, external water current data, external weather data, external sonar data, external GPS data, external compass data, external heading sensor data, external position data from a second watercraft, external directional data from a second watercraft, external directional data from a motor or a rudder of a second watercraft, external image data from a camera, external data regarding the date or time, external navigational data, or external geographical data.

8. The system of claim 6, wherein the external data is received from a second watercraft, via a mesh network that is formed using at least one of Bluetooth Low Energy (BLE), WiFi, or a VHF data exchange system.

9. A marine electronic device for making dynamic routing decisions for a watercraft, the marine electronic device comprising:

a processor; and a memory including computer program code configured to, when executed, cause the processor to:

receive sensor data from one or more sensors located on the watercraft while the watercraft is actively being used in a first voyage, wherein the sensor data includes at least one of a pitch of the watercraft, a heave of the watercraft, a roll of the watercraft, a yaw of the watercraft, G-forces of the watercraft, an autopilot drive activity, a drive load, or a rudder angle; create a weather profile based on the sensor data from the one or more sensors located on the watercraft, and without using any external data, wherein the weather profile is specific to a current position of the watercraft;

make a determination of one or more watercraft operation changes based on the weather profile, wherein the one or more watercraft operation changes includes at least one of a change in power level at a motor, a change in direction of the watercraft, a change in direction for the motor, rotation of a rudder, raising the motor, lowering the motor, rotation of a sail, raising other underwater components, or lowering the other underwater components;

generate, as part of the weather profile, a current ride-comfort characteristic value using the sensor data and a model developed through artificial intelligence, the model being formed based on historical correlations between sensor data from the one or more sensors and a ride-comfort characteristic value indicative of passenger comfort or sea-sickness risk;

compare the current ride-comfort characteristic value to a predetermined comfort threshold; and make, when the current ride-comfort characteristic value exceeds the comfort threshold, the one or more watercraft operation changes based on the determination while the watercraft is actively being used during the first voyage, wherein the marine electronic device is located on the watercraft.

10. The marine electronic device of claim 9, wherein the one or more sensors include at least one of a radar, a direction sensor, a sonar transducer element, an air temperature sensor, a water temperature sensor, a current sensor, a light sensor, or a wind sensor.

11. A non-transitory computer readable medium having stored thereon software instructions that, when executed by a processor, cause the processor to generate display data by:

receiving sensor data from one or more sensors located on the watercraft while the watercraft is actively being used in a first voyage, wherein the sensor data includes at least one of a pitch of the watercraft, a heave of the watercraft, a roll of the watercraft, a yaw of the watercraft, G-forces of the watercraft, an autopilot drive activity, a drive load, or a rudder angle; creating a weather profile based on the sensor data, wherein the weather profile is specific to a current position of the watercraft;

making a determination of one or more watercraft operation changes based on the weather profile, wherein the one or more watercraft operation changes includes at least one of a change in power level at a motor, a change in direction of the watercraft, a change in direction for the motor, rotation of a rudder, raising the motor, lowering the motor, rotation of a sail, raising other underwater components, or lowering the other underwater components;

generating, as part of the weather profile, a current ride-comfort characteristic value using the sensor data and a model developed through artificial intelligence, the model being formed based on historical correlations between sensor data from the one or more sensors and a ride-comfort characteristic value indicative of passenger comfort or sea-sickness risk;

comparing the current ride-comfort characteristic value to a predetermined comfort threshold; and making, when the current ride-comfort characteristic value exceeds the comfort threshold, the one or more watercraft operation changes based on the determination while the watercraft is actively being used during the first voyage.

12. The non-transitory computer readable medium of claim 11, wherein the one or more sensors include at least one of a radar, a direction sensor, a sonar transducer element, an air temperature sensor, a water temperature sensor, a current sensor, a light sensor, or a wind sensor.

13. The non-transitory computer readable medium of claim 11, wherein the processor is configured to receive external data from a second watercraft, wherein the computer program code is configured to, when executed, cause the processor to create the weather profile using the sensor data and the external data.

14. The non-transitory computer readable medium of claim 11, wherein the computer program code is configured to, when executed, cause the processor to:

generate an alert related to the one or more watercraft operation changes and cause the alert to be presented on a display; or generate weather profile data related to the weather profile and cause presentation on the display of the weather profile data.

\* \* \* \* \*